(12) United States Patent
Fehrenbach et al.

(10) Patent No.: US 12,156,194 B2
(45) Date of Patent: Nov. 26, 2024

(54) TRANSCEIVERS AND METHOD FOR OPERATING THE SAME

(71) Applicant: Fraunhofer-Gesellschaft zur Foerderung der angewandten Forschung e.V., Munich (DE)

(72) Inventors: Thomas Fehrenbach, Berlin (DE); Baris Goektepe, Berlin (DE); Cornelius Hellge, Berlin (DE); Thomas Wirth, Berlin (DE); Thomas Schierl, Berlin (DE); Sarun Selvanesan, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 395 days.

(21) Appl. No.: 17/491,059

(22) Filed: Sep. 30, 2021

(65) Prior Publication Data

US 2022/0022204 A1   Jan. 20, 2022

Related U.S. Application Data

(63) Continuation of application No. PCT/EP2020/059023, filed on Mar. 31, 2020.

(30) Foreign Application Priority Data

Apr. 1, 2019  (EP) .................... 19166540

(51) Int. Cl.
*H04W 72/12* (2023.01)
*H04L 5/00* (2006.01)
*H04W 72/0446* (2023.01)

(52) U.S. Cl.
CPC .......... *H04W 72/12* (2013.01); *H04L 5/0005* (2013.01); *H04W 72/0446* (2013.01)

(58) Field of Classification Search
CPC ..... H04L 5/0005; H04L 5/0094; H04L 5/003; H04W 72/12; H04W 72/0446; H04W 28/26; H04W 72/1263; H04W 72/20
(Continued)

(56) References Cited

U.S. PATENT DOCUMENTS 10,201,005 B2 * 2/2019 Yang ................. H04W 72/1215
2010/0020684 A1 * 1/2010 Balakrishnan .......... H04L 5/023
370/329
(Continued)

FOREIGN PATENT DOCUMENTS

CN    107925852 A    4/2018
CN    108353406 A    7/2018
(Continued)

OTHER PUBLICATIONS

3GPP TR 38.804; Technical Specification Group Radio Access Network; Study on New Radio Access Technology; Radio Interface Protocol Aspects, (Release 14).
(Continued)

*Primary Examiner* — Rownak Islam
(74) *Attorney, Agent, or Firm* — PERKINS COIE LLP; Michael A. Glenn

(57) ABSTRACT

A transceiver is configured for communicating in a wireless communication network being operated so as to schedule communication in a plurality of transmission time intervals, each transmission time interval including a plurality of resource elements arranged in a time-frequency grid. Each transmission time interval includes a control section and a data section. The transceiver is configured for transmitting, using a resource in the control section, the resource in the control section containing a reservation information indicating that the transceiver reserves a specific resource in a future transmission time interval.

16 Claims, 17 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2010/0054161 A1 | 3/2010 | Montojo et al. | |
| 2016/0295624 A1 | 10/2016 | Novlan et al. | |
| 2018/0063858 A1* | 3/2018 | Au | H04L 5/003 |
| 2018/0176059 A1* | 6/2018 | Medles | H04W 72/54 |
| 2018/0234888 A1 | 8/2018 | Yasukawa et al. | |
| 2018/0317221 A1 | 11/2018 | Yasukawa et al. | |
| 2019/0075546 A1 | 3/2019 | Yasukawa et al. | |
| 2019/0320453 A1* | 10/2019 | Hosseini | H04L 5/0051 |
| 2019/0349977 A1* | 11/2019 | Hosseini | H04W 72/54 |
| 2019/0357182 A1* | 11/2019 | Liu | H04L 5/0037 |
| 2020/0213035 A1 | 7/2020 | Wang et al. | |

FOREIGN PATENT DOCUMENTS

| | | |
|---|---|---|
| CN | 109474990 A | 3/2019 |
| JP | 2019502329 A | 1/2019 |
| JP | 2019525602 A | 9/2019 |
| WO | 2017026545 A1 | 2/2017 |
| WO | 2017077967 A1 | 5/2017 |
| WO | 2017077976 A1 | 5/2017 |
| WO | 2017077977 A1 | 5/2017 |
| WO | 2018027528 A1 | 2/2018 |
| WO | 2018084614 A1 | 5/2018 |

OTHER PUBLICATIONS

R1-1813522 Nokia, Nokia Shanghai Bell, on Sidelink Resource Allocation, 3GPP TSG RAN WG1 Meeting #95, Spokane, USA, Nov. 12-16, 2018 (6 pages).

R1-1813641 Ericsson—On Mode 2 Resource Allocation for NR Sidelink 3GPP2018-11-033 GPP TSG-RAN WG1 Meeting #95; Spokane, WA, US, Nov. 12-16, 2018 (15 pages).

Ericsson, Physical layer structures of NR V2X, 3GPP TSG RAN WG1 Meeting #94 bis, Chengdu, China, Oct. 2018, R1-1811592.

NEC, Resource allocation mechanism for NR V2X [online], 3GPP TSG RAN WG1 #96, Athens, Greece, Feb. 25-Mar. 1, 2019, R1-1902695.

OPPO "Discussion on mode 2 resource allocation in NR-V2X", 3GPP TSG-RAN WG1 Meeting #94bis, Chengdu, China, Oct. 2018, R1-1810977.

* cited by examiner

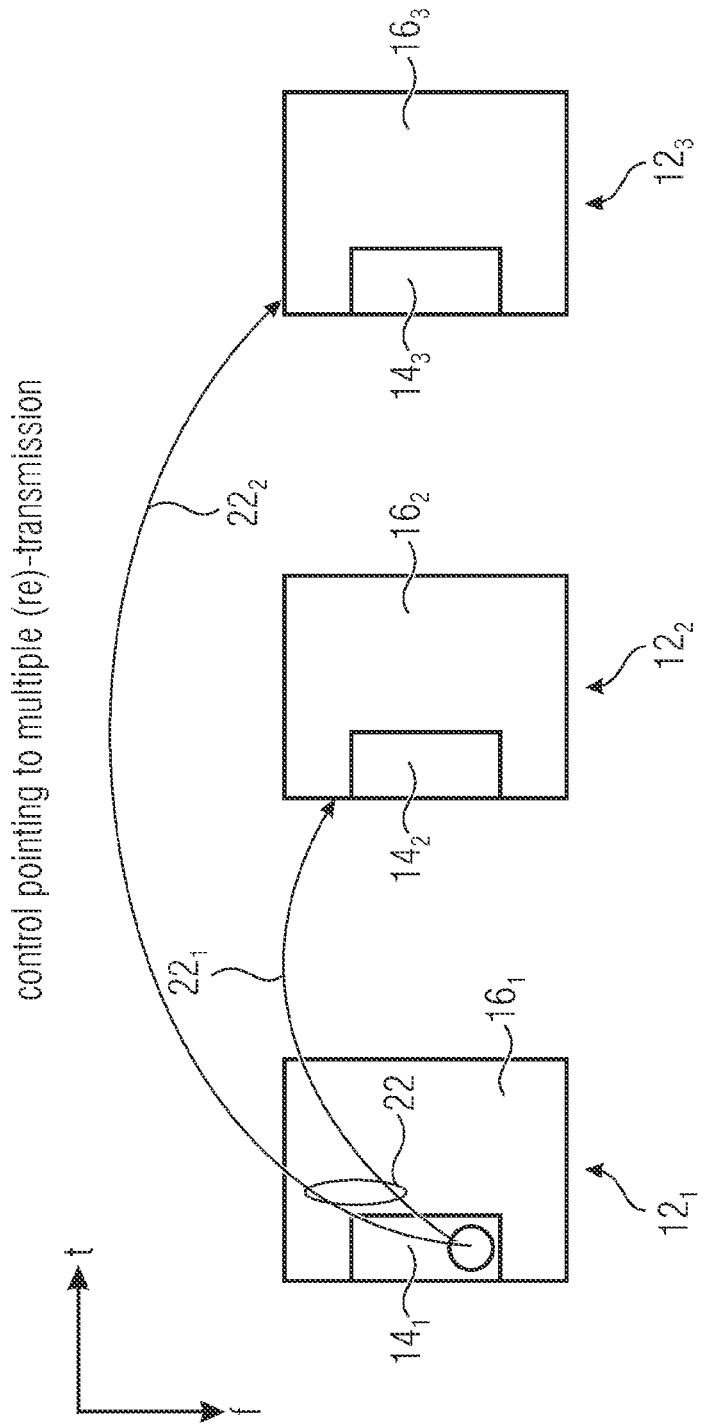

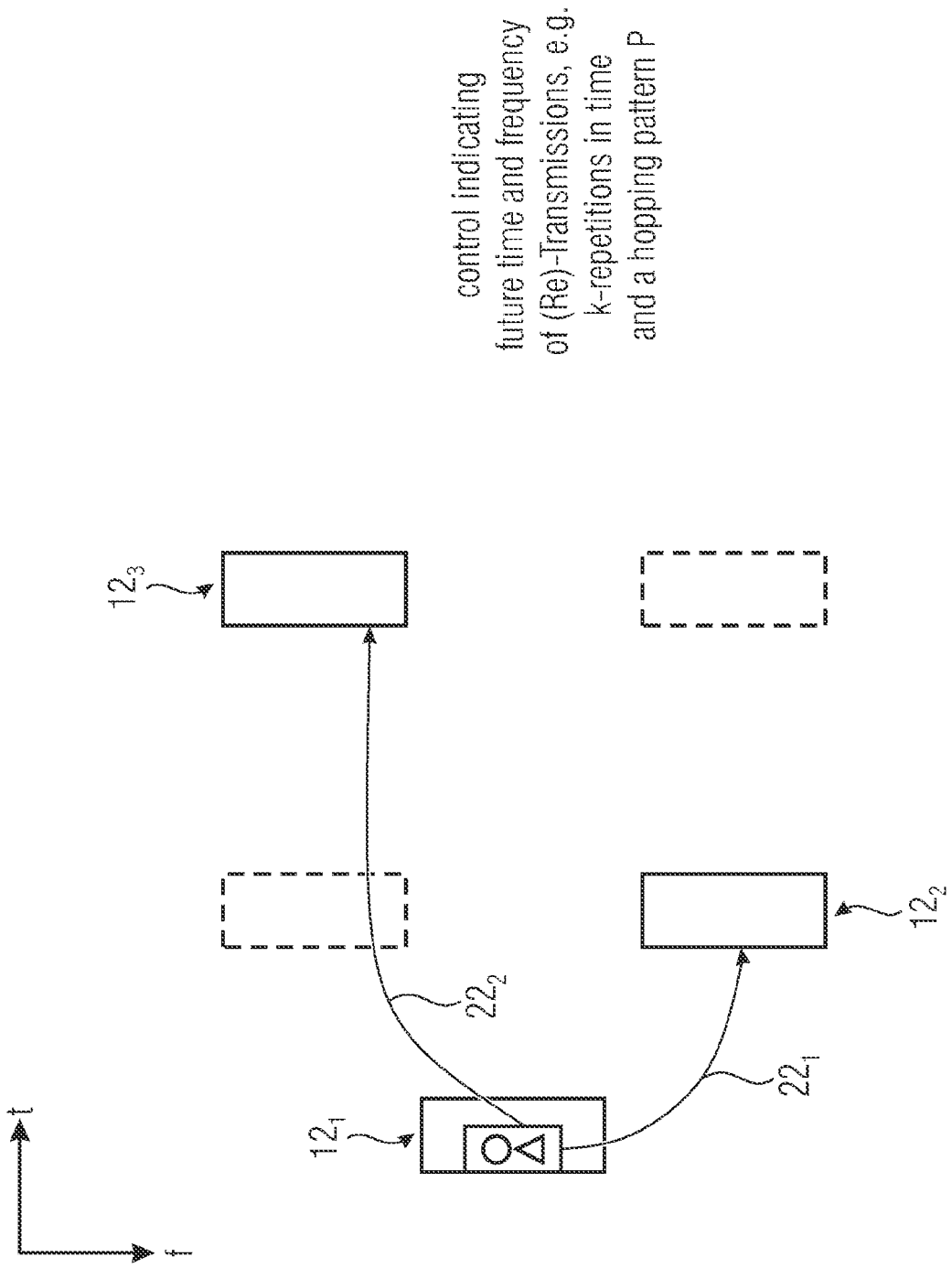

TRANSCEIVERS AND METHOD FOR OPERATING THE SAME

CROSS-REFERENCES TO RELATED APPLICATIONS

This application is a continuation of copending International Application No. PCT/EP2020/059023, filed Mar. 31, 2020, which is incorporated herein by reference in its entirety, and additionally claims priority from European Application No. EP 19166540.5, filed Apr. 1, 2019, which is incorporated herein by reference in its entirety.

The present invention relates to transceivers and to method for operating the same. The present application in particular relates to the field of wireless communication systems or networks such as to new radio (NR), more specifically to approaches for a wireless communication among user devices of a wireless communication system using a sidelink communication, like a vehicle-to-everything (V2X) Pre-emption procedures and to reserving resources in future time transmission intervals. Embodiments concern improvements in the communication over the sidelink, e.g., in particular improvements of resource allocations for NR V2X.

BACKGROUND OF THE INVENTION

The initial vehicle-to-everything (V2X) specification was included in LTE Release 14 of the 3GPP standard. The scheduling and assignment of resources has been modified according to the V2X requirements, while the original device-to-device (D2D) communication part of the standard has been used as the basis of the design.

In LTE V2X, the vehicles transmit messages in one of two ways—either in regular intervals over a duration of time, which is called Semi-Persistent Scheduled (SPS) transmissions, or only once at a single instance, called One Shot (OS) transmissions. For each of these transmissions, there are ProSe per packet priority (PPPP) and a ProSe per packet reliability (PPPR) indicators attached to each broadcasted packet, which dictate the level of priority and reliability needed for the said packet from a given application.

Release 15 of the LTE V2X standards (also known as enhanced V2X or eV2X) was completed in June 2018. The 3GPP includes in NR Rel-16 the first release of NR V2X. NR V2X had identified a set of use cases to be achieved and one of the key focus areas for these use cases is to guarantee a certain Quality-of-Service (QoS) for a given application service.

Especially the concept of reservation of resources for high priority transmissions is an important part of resource allocation mechanisms in NR, as well as in particular in NR V2X. In this context, pre-emption of a resource defines the act of temporarily interrupting the use of this resource to allow data traffic of higher QoS the use of this resource without asking for cooperation. The user which pre-empts its resource intents to resume its task by deferring to another resource element.

The issues faced with the pre-emptive reservation of resources for high priority transmissions include the control signalling aspects that may be used for the pre-emption, the location of the control signalling in the time-frequency grid and the conflict resolution schemes for UEs pre-empting the same resources.

In the Study Item phase of Rel-16 in NR V2X, it has been identified that the sidelink control information (SCI) can be divided into two parts or stages, where the first part can be read by all UEs (user equipment) and points to the second part, which is read only by the intended recipient UE and points to the data.

There is a need for reliable communication, especially for high priority transmissions.

SUMMARY

An embodiment may have a transceiver configured for communicating in a wireless communication network being operated so as to schedule communication in a plurality of transmission time intervals, each transmission time interval including a plurality of resource elements arranged in a time-frequency grid; wherein each transmission time interval includes a control section and a data section; wherein the transceiver is configured for transmitting, using a resource in the control section, the resource in the control section containing a reservation information indicating that the transceiver reserves a specific resource in a future transmission time interval.

Another embodiment may have a transceiver configured for communicating in a wireless communication network being operated so as to schedule communication in a plurality of transmission time intervals, each transmission time interval including a plurality of resource elements arranged in a time-frequency grid; wherein each transmission time interval includes a control section and a data section; wherein the transceiver is configured for transmitting, using a control channel, information indicating that the transceiver reserves a specific resource in a future transmission time interval.

Yet another embodiment may have a transceiver configured for communicating in a wireless communication network being operated so as to schedule communication in a plurality of transmission time intervals, each transmission time interval including a plurality of resource elements arranged in a time-frequency grid; wherein each transmission time interval includes a control section and a data section; wherein the transceiver is a first transceiver and is configured for receiving, from a second transceiver, a signal using a transmission time interval containing, in the control section, reservation information indicating that the a second transceiver reserves a specific resource in a future transmission time interval; wherein the transceiver is configured for abandoning its own scheduled transmission in the indicated specific resource.

According to still another embodiment, a wireless network may have at least one of the inventive transceivers.

According to one embodiment of the application, a transceiver is configured for communicating in a wireless communication network being operated so as to schedule communication in a plurality of transmission time intervals, each transmission time interval comprising a plurality of resource elements arranged in a time-frequency grid.

Each transmission time interval comprises a control section, e.g., a physical sidelink control channel (PSCCH) and a data section such as a physical sidelink shared channel (PSSCH). The transceiver is configured for transmitting, using a resource in the control section, the resource in the control section containing a reservation information indicating that the transceiver reserves a specific resource in a future time slot. This allows for announcing the need of future transmission and thus for a reliable communication.

According to an embodiment, a transceiver is configured for communicating in a wireless communication network being operated so as to schedule communication in a plurality of transmission time intervals, each transmission time interval comprising a plurality of resource elements arranged in a time-frequency grid. Each transmission time interval comprises a control section and a data section. The transceiver is configured for receiving, from a further, different transceiver, a signal using a transmission time interval containing, in the control section, reservation information indicating that the other transceiver reserves a specific resource in a future transmission time interval. The receiving transceiver is configured for abandoning, i.e., cancelling or postponing, an own scheduled transmission in the indicated specific resource.

Further embodiments relate to a wireless network, to methods for operating the described transceivers and to computer readable digital storage mediums.

BRIEF DESCRIPTION OF THE DRAWINGS

Embodiments of the present invention will be detailed subsequently referring to the appended drawings, in which:

FIG. 8a-g show schematic diagrams for illustrating the concept of reserving resources according to embodiments;

DETAILED DESCRIPTION OF THE INVENTION

Figure 1:
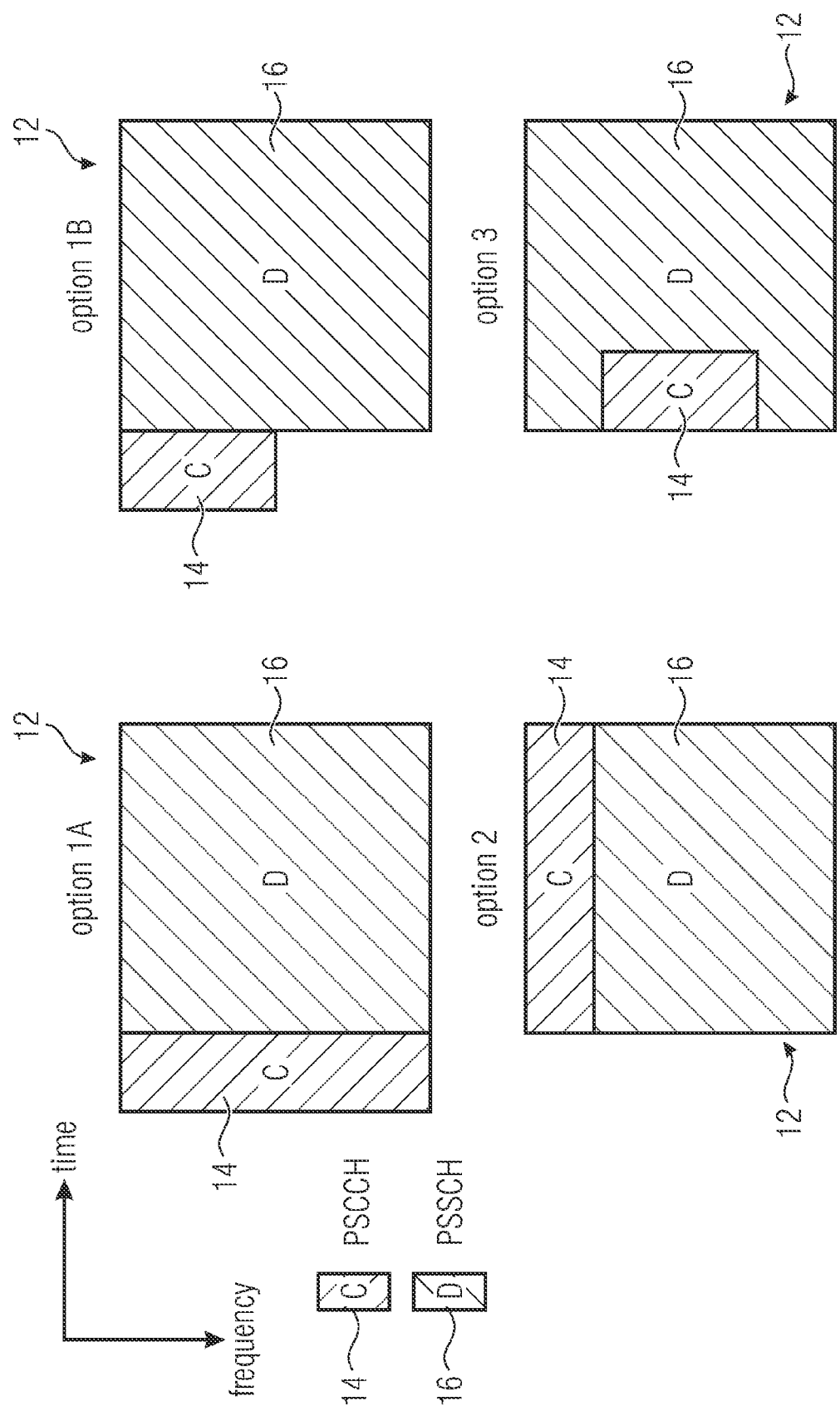
FIG. 1 shows a schematic representation of different options of configurations of a transmission time interval addressed by embodiments of the present invention.

Equal or equivalent elements or elements with equal or equivalent functionality are denoted in the following description by equal or equivalent reference numerals even if occurring in different figures.

In the following description, a plurality of details is set forth to provide a more thorough explanation of embodiments of the present invention. However, it will be apparent to those skilled in the art that embodiments of the present invention may be practiced without these specific details. In other instances, well known structures and devices are shown in block diagram form rather than in detail in order to avoid obscuring embodiments of the present invention. In addition, features of the different embodiments described hereinafter may be combined with each other, unless specifically noted otherwise.

Embodiments described in the following, relate to wireless transmission of signals while making use of resources that are arranged in a time-frequency grid. A granularity of such a time-frequency grid may be understood as grouping resource elements into groups thereof, i.e., resource blocks, wherein a set of resource blocks may form a sub-channel which may be grouped to a set of sub-channels. A resource element may be a subcarrier that may be used for transmitting one or more symbols. A sub-channel may comprise multiple resource blocks (RBs). Different subcarriers can also be mapped to different antennas, allowing spatial multiplexing as in multiple input multiple output (MIMO) or single input multiple output (SIMO) or multiple input single output (MISO) systems, which is also referred to as mapping to the spatial domain. Furthermore, subcarriers can be pre-coded and thus beamformed into certain spatial directions.

Although embodiments relate to transmission time intervals (TTI), the embodiments are not limited hereto. A TTI may also be understood as a time slot of communication such that those descriptions may be exchanged with each other without limitation. A transmission time interval is often abbreviated with TTI, and one TTI duration corresponds to a number of consecutive symbols for one transmission in time domain [TS38.804 5.4.7]. The combination of one numerology $\mu$, e.g. $\mu \in \{0,1,2,3,4\}$ with a subcarrier spacing (SCS) of $2^\mu \cdot 15$ kHz, and one TTI duration determines the exact length of the transmission on the physical layer. Note that a frame or radioframe in NR typically consists of 10 subframes of 1 ms each. Each subframe is divided into slots, each with carrying 14 symbols, e.g. OFDM symbols or SC-FDMA symbols. The number of slots in a subframe depend on the numerology $\mu$. Note that subcarrier and sub-carrier are used as synonyms.

In general, a wireless communication system referred to in any of the embodiments may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with any LTE standard (LTE, LTE-A, LTE-A Pro, LTE evo) or the 5G or NR, New Radio, standard.

Embodiments described herein may relate to transceivers and may in particular be explained in connection with user equipment (UE). Embodiments are not limited to UE but relate, without limitation to other types of transmitters or transceivers, e.g., a transceiver comprising at least one of
  a user equipment;
  a mobile or immobile base station,
  a mobile terminal,
  a stationary terminal,
  a cellular IoT-UE, a vehicular UE,
a group leader UE (GL),
an IoT or narrowband IoT, NB-IoT, device,
a ground based vehicle,
an aerial vehicle,
a drone,
a moving base station,
a road side unit (RSU),
a building, and
any other item or device provided with network connectivity enabling the item/device to communicate using the wireless communication network, e.g., a sensor or actuator.

For example, a mobile or immobile base station, may comprise one or more of
a macro cell base station,
a small cell base station,
a central unit of a base station,
a distributed unit of a base station,
a road side unit,
a UE,
a group leader (GL),
a relay,
a remote radio head,
an AMF,
an SMF,
a core network entity,
a mobile edge computing entity,
a network slice as in the NR or 5G core context, and
any transmission/reception point, TRP, enabling an item or a device to communicate using the wireless communication network, the item or device being provided with network connectivity to communicate using the wireless communication network.

FIG. 1 is a schematic representation of different options 1A, 1B, 2 and 3 of a transmission time interval 12 addressed by embodiments of the present invention. A transmission time interval may be used to transmission information that is grouped, for example, into a control section 14, for example, a Physical Sidelink Control Channel (PSCCH) and a data section, for example, a Physical Sidelink Shared Channel (PSSCH). According to an embodiment, a transmission time interval is implemented so as to occupy a plurality of sub-carriers or resource blocks in a time interval, wherein the control section 14 is transmitted at a beginning of the transmission time interval for a duration of a first time sub-interval and a subset of the plurality of sub-carriers or resource blocks. The data section 16 may be transmitted in the first time sub-interval in remaining sub-carriers or resource blocks and after the first time-sub interval in the plurality of sub-carriers or resource blocks.

The control section may occupy the complete frequency range, i.e., all subcarriers, for a certain time as illustrated for option 1A. Alternatively, the control section 14 may occupy only a part of the subcarriers as indicated in option 1B. Alternatively, the control section may occupy a part of the frequency range or spectrum, i.e., some of the subcarriers for a complete duration of the transmission time interval as illustrated for option 2. The data section 16 may form an associated and/or linked part of the transmission time interval 12 as shown for options 1A, 1B and 2. Alternatively or in addition to be associated with a data section of the same transmission time interval, the control section may be associated with a future transmission time interval. Occupying a frequency or frequency band may be understood as using the respective frequency (band) for transmission.

Embodiments described herein will relate to option 3 which does not limit the scope of the present invention but is chosen for explanatory reasons. The control section 14 comprises a subset of subcarriers for a part of a time duration of the transmission time interval 12. During a time of the control section 14, subcarriers that are unused for the control section 14 may be used for the data section 16.

Figure 2A:
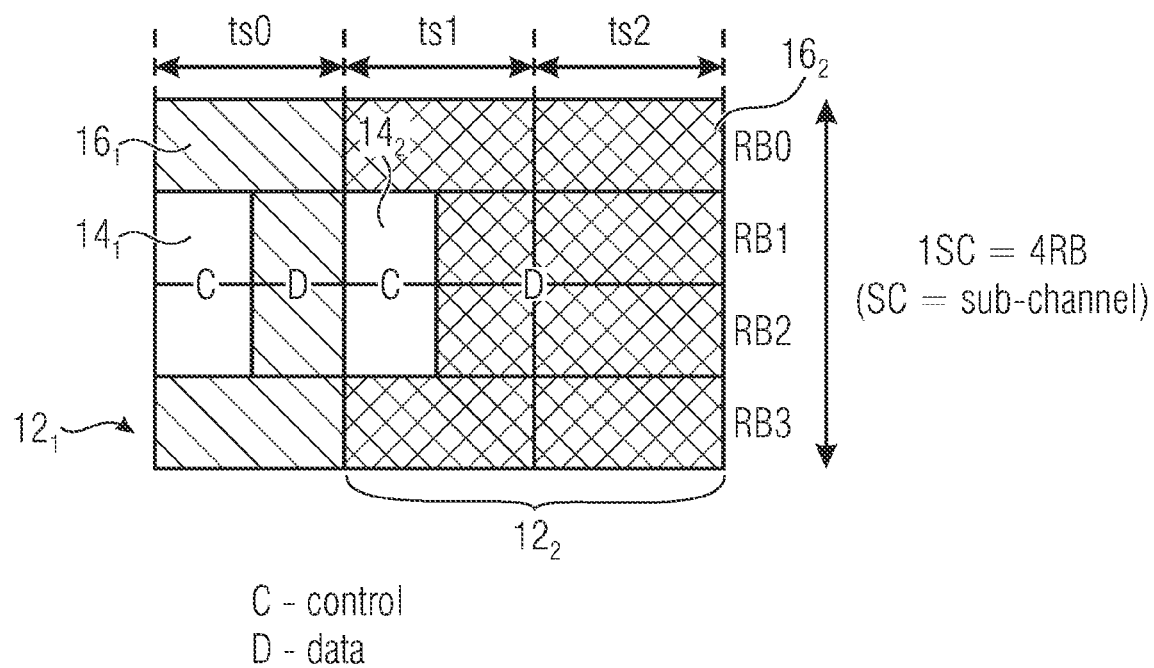
FIG. 2a shows a schematic diagram of two subsequent transmission time intervals, wherein transmission time interval according to embodiments.

FIG. 2a shows a schematic diagram of two subsequent transmission time intervals $12_1$ and $12_2$, wherein transmission time interval $12_1$ may occupy one time slot TS0, wherein transmission time interval $12_2$ may occupy a different length in time, for example, time slots TS1 and TS2. Each transmission time interval may comprise a respective control section $14_1$ and $14_2$ and a respective data section $16_1$ and $16_2$ that are implemented according to option 3 of FIG. 1. The transmission time intervals $12_1$ and $12_2$ may occupy, in the frequency range, four resource blocks RB, e.g., RB0, RB1, RB2 and RB3 that form commonly a sub-channel SC.

Figure 2B:
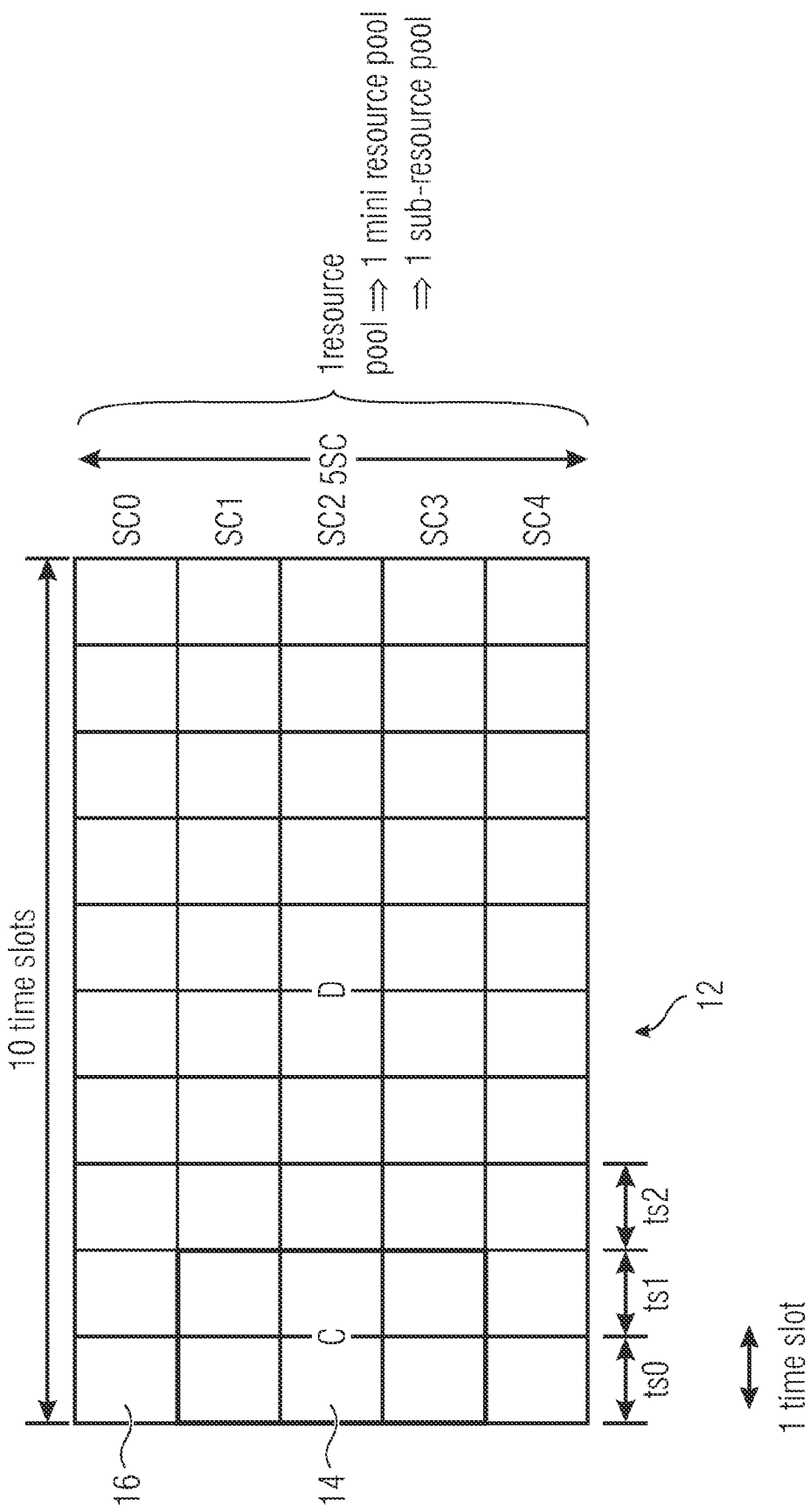
FIG. 2b shows a different possible implementation of a transmission time interval according to an embodiment.

According to FIG. 2b, a different possible implementation of a transmission time interval is shown, where the transmission time interval 12 occupies ten time slots in total, wherein the control section 14 is not limited to a part of a time slot as shown in FIG. 2a but occupies more than one, e.g., two time slots TS0 and TS1. Alternatively or in addition, the control section 14 may occupy one complete sub-channel or even more, for example, three subchannels SC1, SC2 and SC3. It is alternatively possible to occupy one or more of the subchannels SC0 to SC4 partially. The five subchannels may form a resource pool RP being a mini resource pool and/or a sub-resource pool.

In connection with embodiments described herein, a transmission time interval may be implemented so as to occupy a single time slot which is just an example as described in connection with FIGS. 1, 2a, and 2b.

Figure 3:
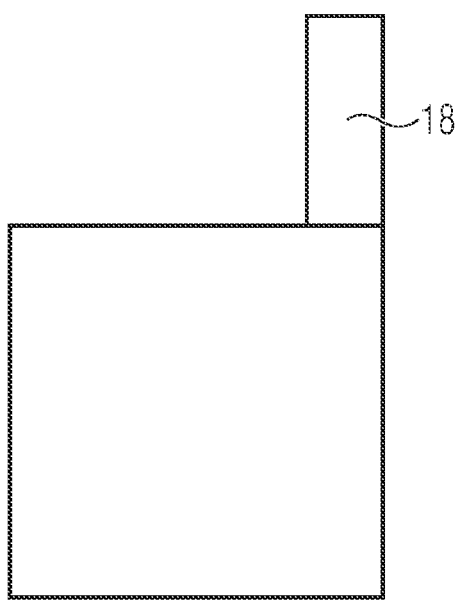
FIG. 3 shows a schematic block diagram of transceiver according to an embodiment.

FIG. 3 shows a schematic block diagram of transceiver 30 according to an embodiment. The transceiver 30 may comprise an antenna arrangement 18 that may comprise a single antenna, a cross-polarized antenna, a MIMO antenna comprising of several antennas, or an antenna array to perform wireless communication according to the schemed described herein. Optionally, the transceiver 30 may be configured for performing beamforming with the antenna arrangement 18. The transceiver 30 may be a mobile device such as a smartphone, a laptop, a car, a manned or unmanned aerial vehicle (UAV), Internet of Things (IoT)-device or the like, but also may be a immobile device such as a building, a roadside unit RSU, a stationary IoT device or the like. Embodiments are not limited hereto. For example, the transceiver 30 may also be a satellite or the like.

The transceiver 30 is configured for communicating in a wireless communication network being operated so as to schedule communication in a plurality of transmission time intervals. Each transmission time interval may comprise a plurality of resource elements arranged in a time-frequency grid as described in connection with FIGS. 1, 2a and 2b. Each transmission time interval may comprise a control section 14 and a data section 16. The transceiver 30 is configured for transmitting, using a resource in the control section 14, a reservation information indicating that the transceiver reserves a specific resource in a future time slot. The specific resource that is reserved may be a resource of the data section 16. Such a reservation may be made explicitly by indicating the resource directly. Alternatively, the reservation information may point towards a control section of a future transmission time interval which then points to the specific resource of the transmission time interval. Thereby, an implicit reservation information may be transmitted.

For example, the network may provide for sidelink communication, i.e., communication may be scheduled in a sidelink of the system. The sidelink may provide and/or use a set of sidelink resources defining one or more of:
- a resource pool (RP),
- a mini-resource pool (mRP),
- a band width part, BWP having a start frequency, an end frequency and a numerology, in a resource pool,
- a resource pool in a BWP.

Figure 4:
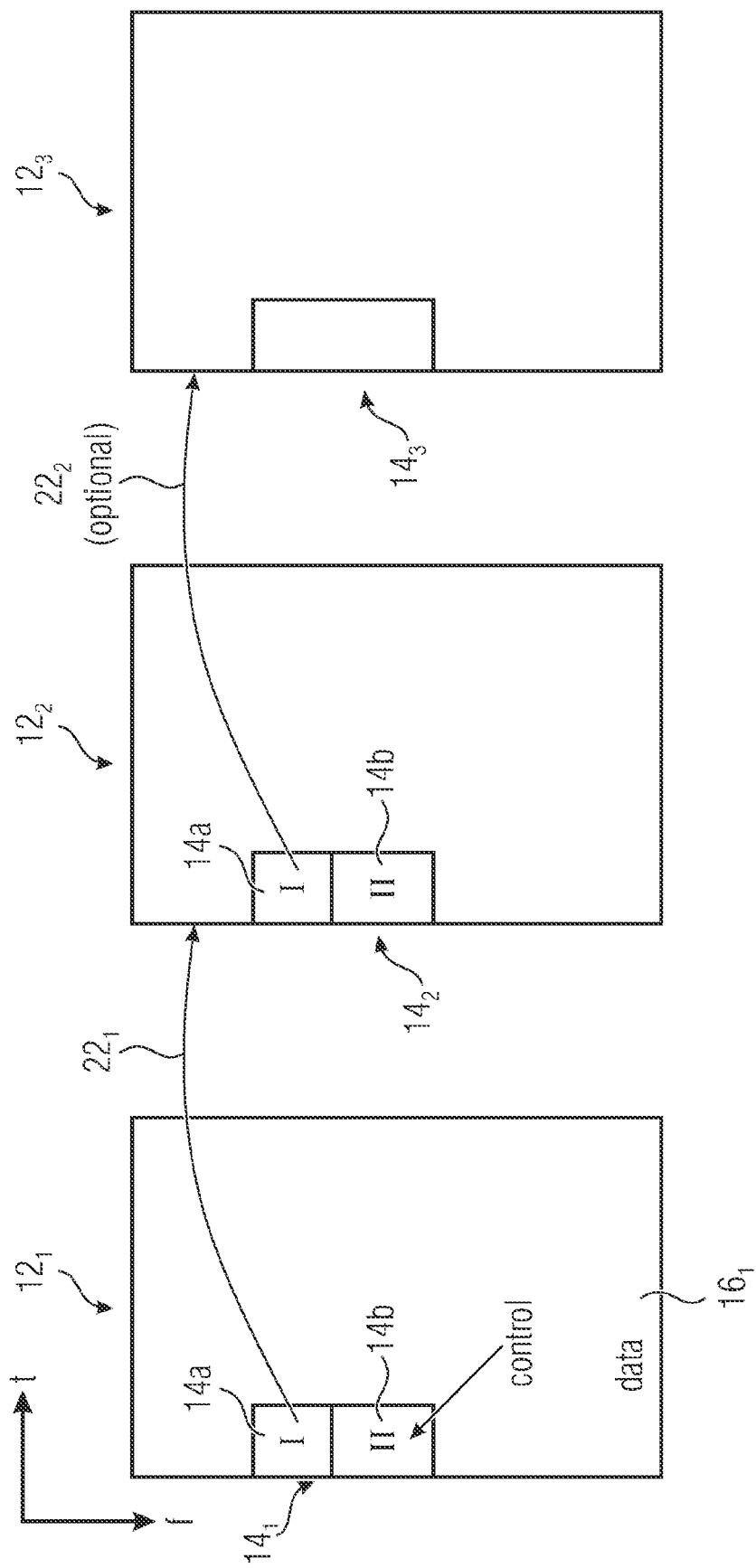
FIG. 4 shows a schematic diagram for illustrating an announcement to other UEs the time and frequency location of a future transmission time interval for the purpose of reservation according to an embodiment.

According to embodiments, the transceiver 30 may be configured for using the resource for transmitting the reservation information indicating that the transceiver reserves the specific resource in the future transmission time interval by using a resource of a first subset of resources of the control section as indicated, for example, in FIG. 4 showing three subsequent transmission time intervals $12_1$, $12_2$ and $12_3$. The first subset 14a (I) of the control section 14 may comprise a first portion, subset or part of the resources of the control section 14, whilst a second subset 14b may optionally comprise further or remaining resources. Whilst the subset 14b may be used to point towards the data section $16_1$ of transmission time interval $12_1$ so as to enable decoding of the data section $16_1$, resources of the subset 14a may be used to transmit one (or more) reservation information $22_1$ which points to a future transmission time interval $12_2$ which may optionally be the subsequent transmission time interval but may also be any other future transmission time interval.

Optionally, the transceiver may be configured for transmitting another, further reservation information using the subset 14a of the data section $14_2$ of the transmission time interval $12_2$ so as to reserve for a resource in another future transmission time interval $12_3$. That is, in the transmission time interval $12_1$, the subset 14a may be used for transmitting the reservation information $22_1$ indicating that the transceiver reserves the specific resource in the future time slot $12_2$. The transmitter may be configured for transmitting, in the same transmission time interval by using a resource of the subset 14b of the control section 14 information associated with the data section 16 of the transmission time interval $12_1$. Alternatively, a different transceiver may transmit respective information in the subset 14b. The subsets 14a and 14b may comprise distinct and/or disjunct subsets of resources. Other embodiments may have a common control section 14.

The resources of subset 14a may be transceiver unspecific and may be evaluated, received and/or decoded by each transceiver that becomes aware of the respective signal. In contrast, resources of subset 14b may be transceiver specific, i.e., only those transceivers decode data that are addressed by the respective resources.

In other words, a possible design is a two-stage control information signaling, with details on the location of the two stages in the time-frequency grid. Other aspects defined in connection with present embodiments may relate to conflict resolution schemes to be employed when more than one transceivers (e.g., UEs) intend to reserve the same resource for high priority transmissions. A further aspect of the present embodiments is a use of a k-stage control information which is used by a UE/transceiver transmitting with high Quality-of-Service (QoS) during a transmission with k repetitions. Here, a UE with lower QoS will align its resource pre-emption according to the control information decoded from the k-stage control information element in order to reduce interference to this message and increase the probability that other UEs can decode the k-stage control information.

The control portion may at least in part be multiplexed in a Frequency Division Multiplex (FDM) scheme in which the first subset 14a is associated with a first number of resources and the subset 14b is associated with a second number of resources, wherein each resource may refer to a set of resource elements, to a resource block, to a set of resource blocks that form a sub-channel and/or a set of sub-channels. According to an embodiment, the number of resources of subset 14a may be one. This resource may be the first resource of the control section in the frequency range, i.e., the one with the lowest frequency, frequency range or frequency band.

In other words, based on the option 3 of FIG. 1 that may be selected as a configuration of a transmission time interval or frame format, the control region or control section 14 may be divided into two parts, e.g., PSCCH1 (14a) and PSCCH2 (14b), where PSCCH1 can be read by all UEs and PSCCH2 may be UE specific. The design can be implemented in an FDM, a Time Division Multiplex (TDM) and/or a Spatial Division Multiplex (SDM) fashion, wherein the concepts may be combined with each other such that parts of the respective data section or subsets thereof may each be multiplexed in a FDM, TDM and/or SDM scheme.

When implementing FDM control region division, PSCCH1 may occupy the first sub-channel within the control region in a time slot, a transmission time interval respectively. In the case where the control region 14 as a whole occupies only a single sub-channel, PSCCH1 will be transmitted in the first few RBs of the sub-channel. The remaining part of the control region 14 will be used for the transmission of PSCCH2. In a given time slot (transmission time interval) 1, UE1 may use PSCCH1 to reserve resource(s) in future time slots/transmission time intervals, by announcing to other UEs the time and frequency location of the future time slot. In the same set time slot 1, another UE2 can transmit a PSCCH2 which is linked to the data region 16 in the same time slot. This is illustrated, for example, in FIG. 4. It is to be noted that the data section 16 can also be empty such that only the control section 14 is transmitted. Control region I, i.e., subsection 14 may point to a next control-data element, e.g., control section $14_2$ of future time slot $12_2$, wherein control region II, i.e., subset 14b may point to the data and can include the information that may be used to decode the data.

That is, FIG. 4 shows a general definition of two-stage Sidelink Control Information (SCI): two control elements and one data element are implemented in a time slot/transmission time interval.

Figure 5:
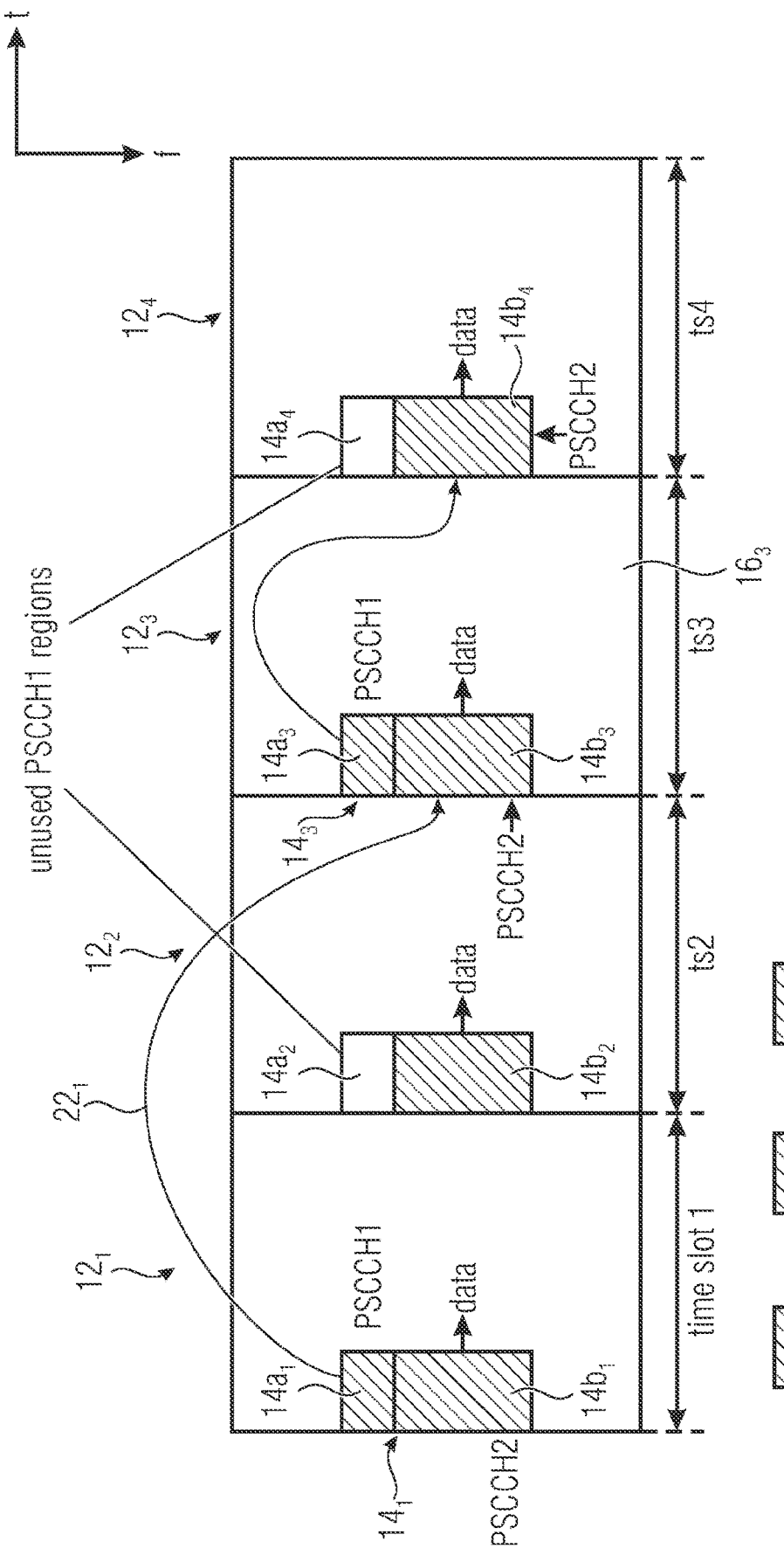
FIG. 5 shows a schematic block diagram of an implementation of four transmission time intervals in an FDM scheme according to an embodiment.

FIG. 5 shows a schematic block diagram of an implementation of four transmission time intervals $12_1$ to $12_4$ in four respective time slots (TS)1, TS2, TS3 and TS4. For example, subsets 14a2 and 14a4 of transmission time intervals $12_2$ and $12_4$ may remain unused in the present example. In time slot 1, a first transceiver, e.g., UE1, may transmit a reservation information $22_1$ that points to data section $14_3$, in particular, subset 14b3 which itself points to data section $16_3$ that is then transmitted by UE1. That is, UE1 reserves resources on data section $16_3$ by use of the reservation information $22_1$. This information is recognized by other transceivers UE2 and UE3, for example, each implemented as transceiver 30 of FIG. 3.

Whilst subset 14b, of transmission time interval $12_1$ may be used by a UE2 or UE3 different from UE1 transmitting the reservation information, the other UEs may abandon or postpone or cancel their data transmissions in transmission time interval $12_3$.

Figure 6:
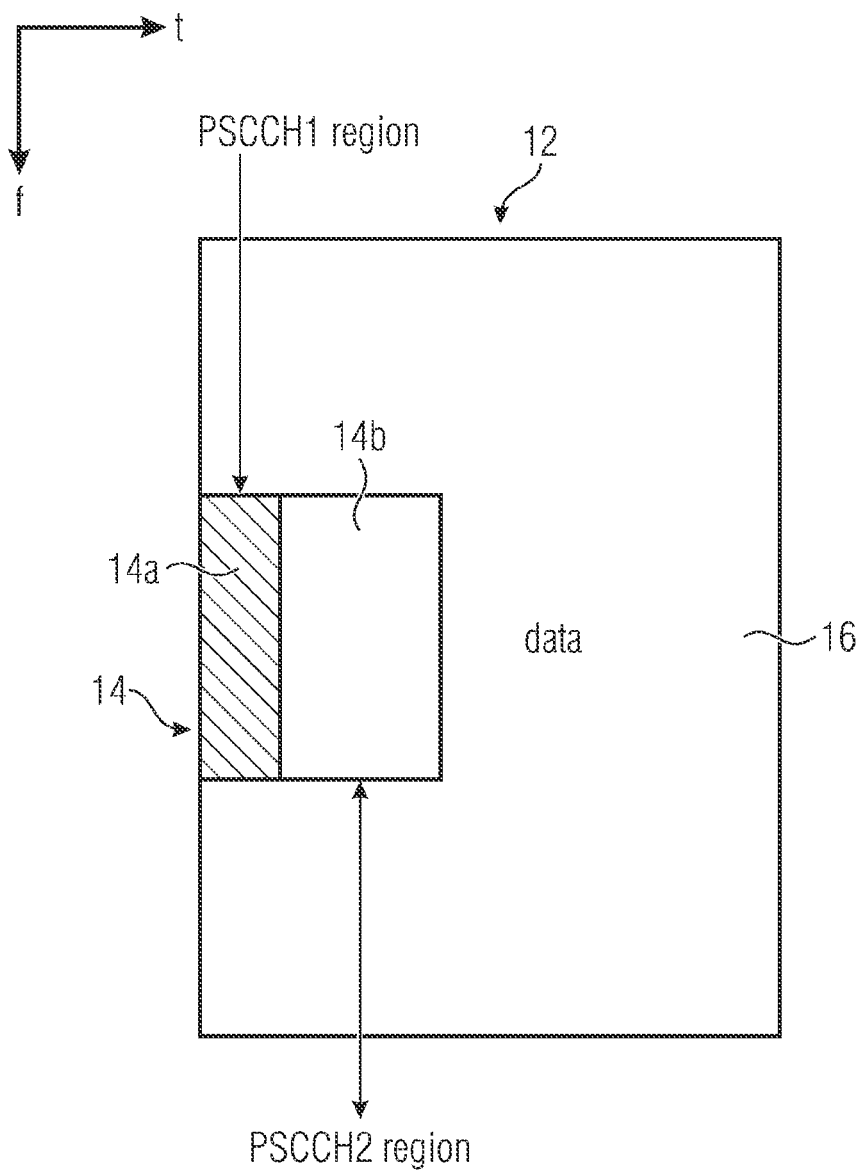
FIG. 6 shows an example for a TDM scheme implemented in the control region according to an embodiment.

Whilst FIG. 4 and FIG. 5 show schematic exemplary illustrations for a FDM scheme, FIG. 6 shows an example for a TDM control region division. The subset 14a may be associated with a first number of symbols and the subset 14b may be associated with a second, different number of symbols that each occupy the complete frequency range of the control section 14 for a specific time.

In other words, similar to the previous design (FDM) embodiments allow that the PSCCH stages can be divided in a TDM fashion, which PSCCH1 occupying the first few symbols of the control region 14, followed by PSCCH2 occupying the remaining of the control region 14.

Figure 7:
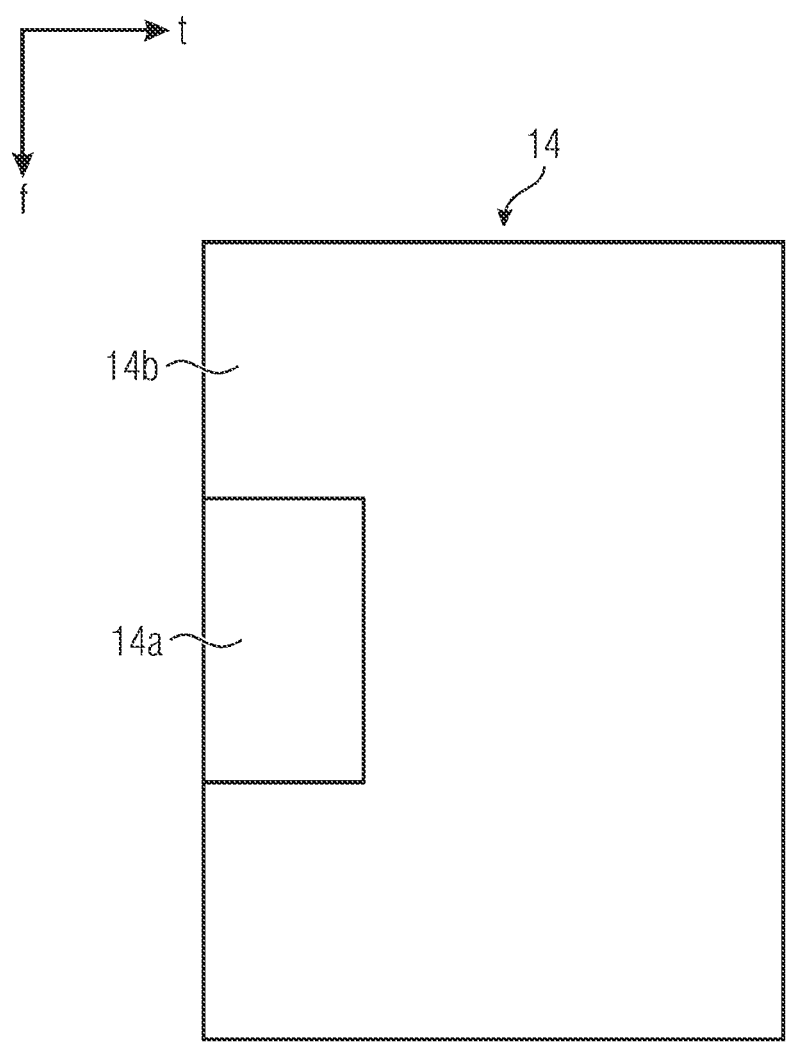
FIG. 7 shows a schematic diagram illustrating a combination of FDM and TDM according to an embodiment.

The FDM scheme and the TDM scheme may be implemented alone or in combination with each other as indicated in FIG. 7 in which a combination of FDM and TDM is implemented. Alternatively or in addition, the control subsets can be multiplexed, at least partially, in a Spaced Division Multiplex (SDM) scheme. This may be obtained, for example, by precoding or other means of phase-shifting, or by performing analog or digital beamforming and using different beams along different directions or regions. A first subset of the available beams may be associated with the subset 14a and a second, different number or subset of beams may be associated with the subset 14b. A beam may be understood as a means for beamforming. A beam may pertain to a lobe pointing into a certain direction from a transmitter to a receiver. A first beam can have a defined beam with a length which can contain a portion of a control, a second beam may have a second portion of control and/or data, and a third beam may control a data section.

According to an embodiment, an amount of resources of the subset 14a may be smaller when compared to an amount of resources of the subset 14b. This may allow to maintain a high throughput of the wireless communication. By use of the subset 14a, the transceiver may transmit the reservation information 22 so as to indicate a time and a frequency information of the future transmission time interval, which then contains the second subset 14b of the control section 14 and the corresponding data.

According to an embodiment, a sub-channel described herein may comprise multiple resource blocks (RBs). It is possible that the entire control and data regions 14 and 16 are multiplexed with the same sub-channel. In this case, among the RBs used for the control channel, the first few are used for the first portion, and the remaining for the second portion.

For example, if there are five RBs in a sub-channel, based on option 3 of FIG. 1, in a time slot containing control and data, it is possible that the first and last RBs are for data and the middle three are for control. Among the three meant for control, the first RB may be used for the first portion (reservation) and the second and third RBs may be used for the second portion 14b. Along frequency this may look like D(80a), C(ONTROL)1, C2, C3, D.

The reservation information may thus point to the second portion 14b of the control section 14 of a future time slot $12_2$, $12_3$ or another time slot/transmission time interval, which in turn points to a data element of the data section 16 of the indicated future time slot.

The splitting of the control section 14 into subsets 14a and 14b is optional. According to embodiments, a different or even no splitting may be used. Those embodiments share that the control section 14 is still used to transmit the reservation information 22.

Figure 8A:
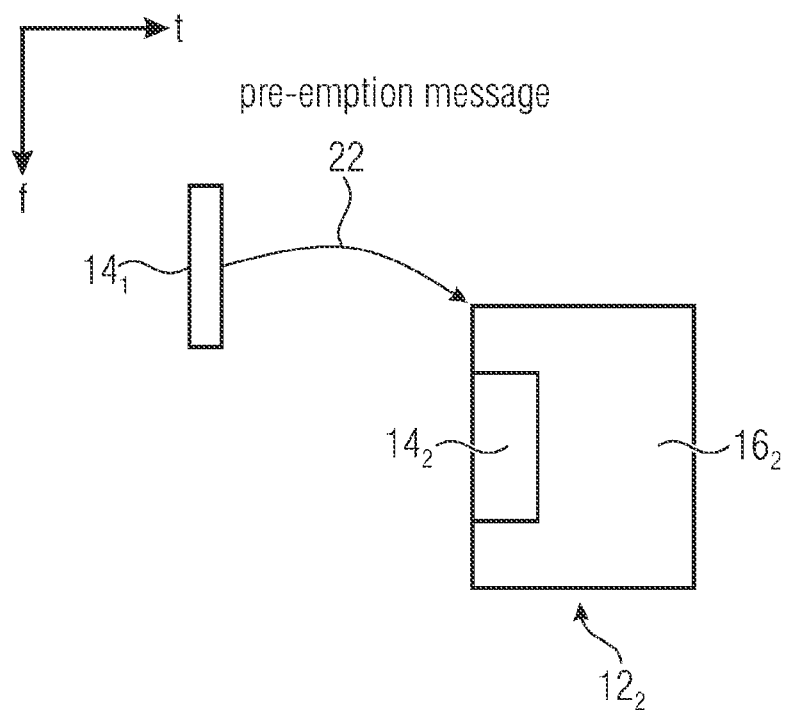
Figure 8B:
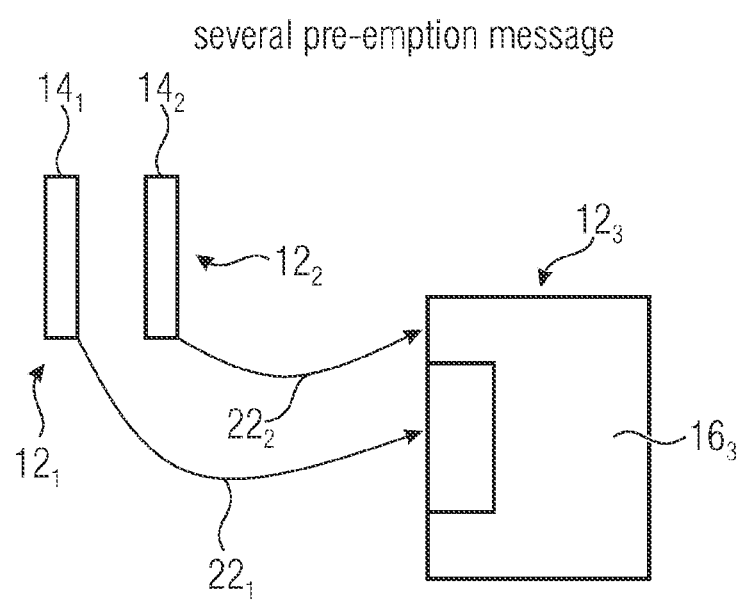

According to an embodiment, a transceiver may be configured for reserving the same specific resource in the future transmission time interval/time slot by transmitting the reservation information in at least a first and a second transmission time interval/time slot. When compared to FIG. 8a that shows transmission of a pre-emption message, i.e., reservation information 22, in a control section $14_1$ of a first transmission time interval so as to reserve resources in a future transmission time interval $12_2$, FIG. 8b shows such a configuration. Regardless if respective data sections are transmitted together with the control sections $14_1$ and $14_2$ of different transmission time intervals $12_1$, $12_2$ and $12_3$, a transceiver according to an embodiment may, at least in two transmission time intervals transmit reservation information $22_1$ and $22_2$ pointing to the same transmission time interval $12_3$. The transmission time intervals $12_1$ and $12_2$ on the one hand and $12_2$ and $12_3$ on the other hand may follow directly one to another but may also have a distance in time with respect to another.

Figure 8C:
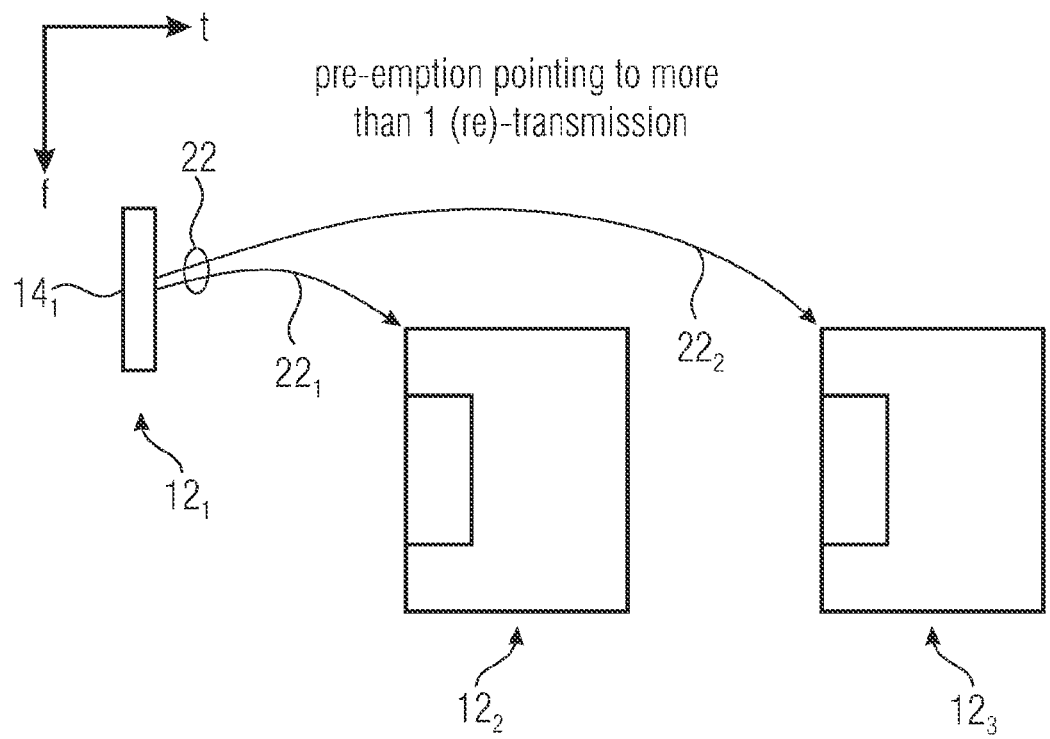

Alternatively or in addition and as shown in FIG. 8c, specific resource indicated in the reservation information 22 may be a first specific resource of a first transmission time interval $12_2$. The transceiver may be configured for transmitting the reservation information 22 so as to indicate, additionally, that the transceiver reserves at least a section specific resource in the same future transmission time interval, for example, if resources contained in the data section may be used by different transceivers. Alternatively or in addition, the transceiver may indicate that the transceiver reserves at least a further specific resource element in a different transmission time interval $12_3$. As mentioned, the reservation information 22 may point directly towards the single resource to be used for data transmission or a set thereof but may also point to the respective control section 14. I.e., FIG. 8c shows a pre-emption pointing to more than one (Re)-transmission, whilst FIG. 8b shows a transmission of several pre-emption messages $22_1$ and $22_2$.

In other words, the pre-emption indication message, the reservation information, can be sent in a dedicated control channel (information element) which points to one (FIG. 8a) or more (FIG. 8c) upcoming data regions to be preempted by other UEs. To increase the reliability, more than one-pre-emption indication message can be sent which points to the same data region to be preempted by other UEs as indicated in FIG. 8b.

Figure 8D:
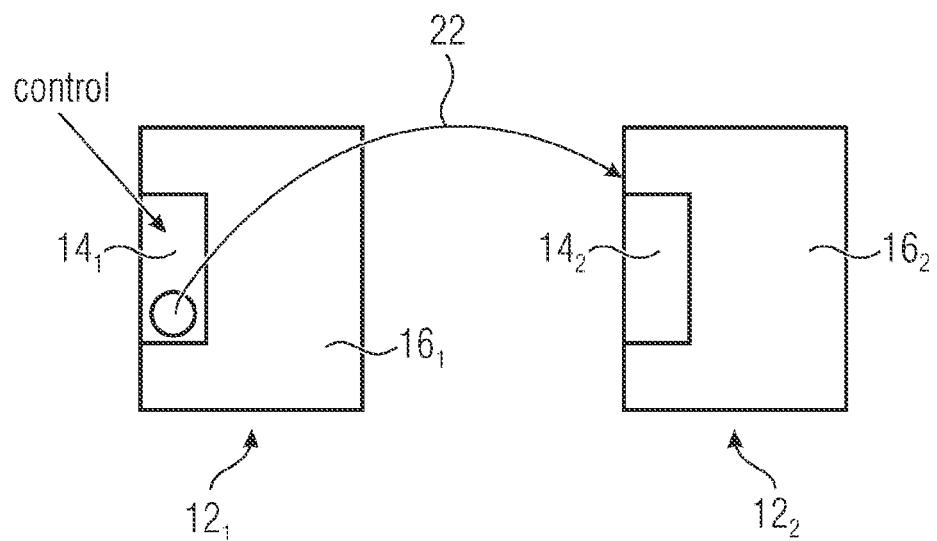

According to an embodiment that is shown in FIG. 8d, the reservation information may be a first reservation information. The transceiver may be configured for transmitting in the first future transmission time interval $12_2$ data using the reserved specific resource. The transceiver may be configured for including, into the control section $14_2$ of the future transmission time interval, a second reservation information so as to reserve a resource in a second, different future transmission time interval for retransmitting the data. That is, FIG. 8d use of control indicating future (Re)-Transmission.

In other words, the idea shown in FIG. 8d is that in the first transmission time interval, the control has two functionalities. It directly points to data within the same transmission time interval $12_1$ and it points to the control in a future transmission time interval $12_2$, which in turn points to data within the same future transmission time interval $12_2$.

According to an embodiment that is illustrated in FIG. 8e, the specific resource indicated by a first reservation information $22_1$ is a first specific resource. The future transmission time interval $12_2$ is a first future transmission time interval. The transceiver is configured for transmitting the reservation information 22 so as to indicate reservation $22_1$ of the specific resource in future transmission time interval $12_2$ and to indicate reservation of another specific resource in a second, different future transmission time interval for retransmitting data. The reservation information 22 may be a combined information but may also be implemented as two separate information blocks.

Retransmission of data may be understood as transmitting, as the retransmission, an exact copy of the previously transmitted data (as in data duplication), a redundancy version of the exact copy, additional data and/or data different from the transmission in the first future transmission time interval. That is, repeatedly or at the same time reserved resources may be used for transmitting same data but are not required to be used that way. Whilst FIGS. 8a, 8b and 8d show a dedicated preemption control, FIGS. 8d and 8e are directed to a repetition indication of a high-priority message. In other words, in a further approach, the UE transmitting with high priority can make use of a k-repetition scheme, in order to increase the reliability. This can also be used to indicate further (future) transmission as indicated in FIG. 8d, to be preempted by other UEs. Here, the control information can also point to several (i.e., two or more, e.g., three, four, five, ten or more), data elements as shown in FIG. 8e. The control 14 can link to a data element, i.e., at least a part of section 16, where the data can be either an exact copy of the first data element, a redundancy version of that or can contain new or additional data.

Figure 8F:
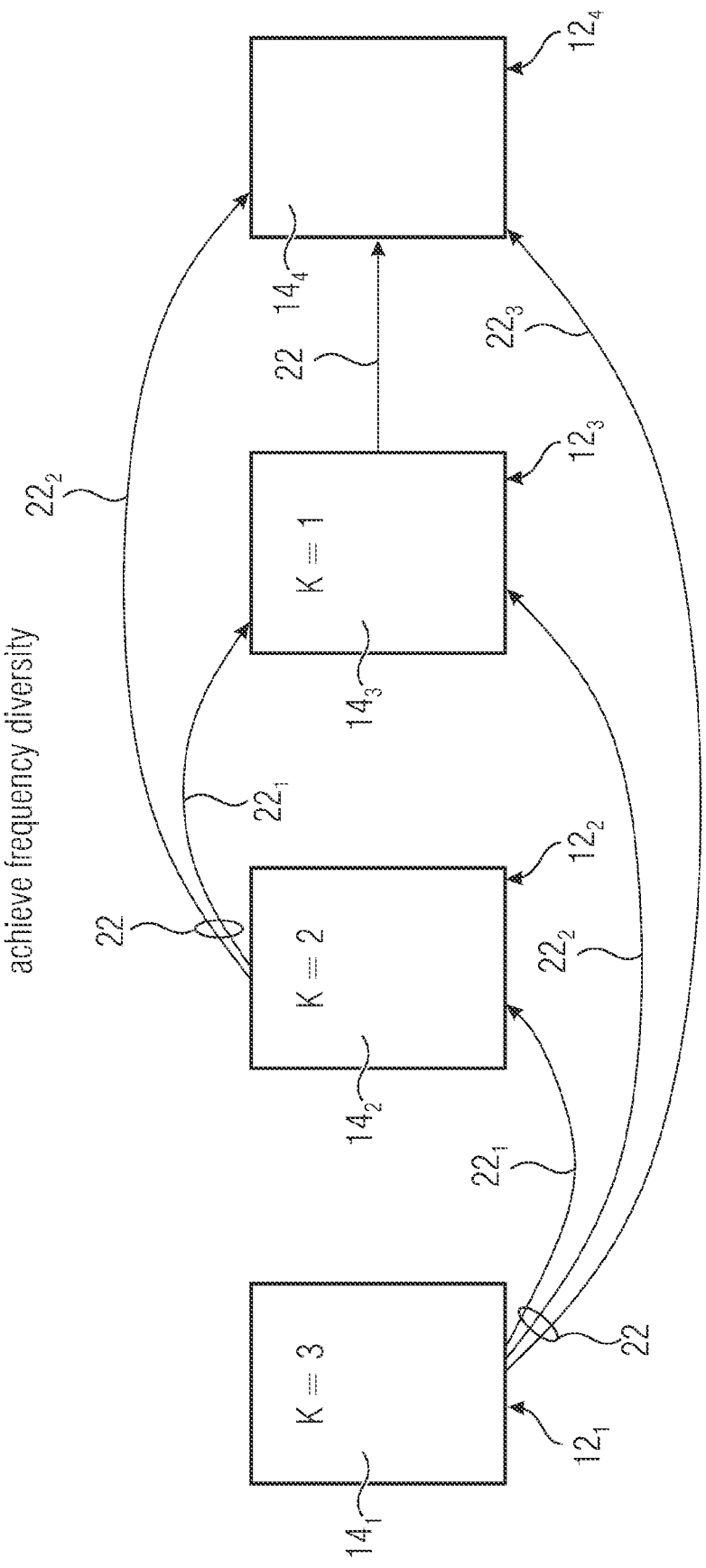

According to an embodiment that is illustrated in FIG. 8f, the future transmission time interval may be a first future transmission time interval $12_2$. The transceiver may be configured for scheduling data transmission in a plurality of at least two, at least three, at least four, at least five or at least ten future transmission time intervals. The transceiver may be configured for including, into the control section $14_1$ the reservation information 22 so as to indicate, e.g., by use of a counter k or a different information, a plurality of reservations of specific resources in the plurality of future time frames. The transceiver may transmit in each of the future transmission time interval/time slots $12_2$, $12_3$ and $12_4$ the reservation information related to remaining transmission time intervals. For example, the transceiver may indicate a requirement of a number of k transmissions, k=3. The reservation information 22 used in transmission time interval $12_1$ may indicate reservation of respective resources in k=3 subsequent transmission time intervals. In transmission time interval $12_2$ a first transmission may be occurred and the counter may be decremented such that the reservation information 22 transmitted in transmission time interval $12_2$ may reserve for two future transmission time intervals. Accordingly, after another retransmission, k may, again, be decremented such that the reservation information transmitted in transmission time interval $12_3$ is directed to transmission time interval $12_4$ only. That is, the control may point to all remaining retransmissions. A looping pattern P may be indicated to achieve frequency diversity which is illustrated in FIG. 8g. In other words, UEs that missed a previous preemption message can benefit by receiving a further preemption message as shown in FIG. 8f. The control information element can contain a counter, which indicates the remaining transmissions. Other UEs, when reading the control information element, can evaluate this control information element and can adjust their channel access accordingly, e.g., defer its transmission by a shift using this information as a network allocation vector (NAV). For example, the retransmissions according to FIG. 8f may use a same frequency such that the retransmission occupy a same frequency band when compared to the future time slot. The transceiver may be configured for selecting the future time slot or transmission time intervals so as to occupy resources on the same frequency when compared to the transmission time interval.

According to an embodiment that is illustrated in FIG. 8g, the transceiver may be configured to select the future transmission time interval so as to occupy a different frequency band when compared to the transmission time interval $12_1$. That is, one or more reserved resources in future transmission time intervals $12_2$ and $12_3$ may be arranged in different frequency ranges or frequency bands when compared to the transmission time interval $12_1$. A specific frequency f and therefore selected transmission time intervals may be selected according to a pattern in frequency and/or time. That is, the control may indicate a future time and frequency of (Re)-Transmissions, e.g., k-repetitions in time and a hopping pattern P in frequency.

Note that a different frequency band can also be an aggregated carrier in a neighboring frequency band (continuous) or in any other lower or higher frequency band (non-continuous) such as in standard carrier aggregation (CA) procedures. Note that also dual- or multi-connectivity can be allowed in future releases, such that UEs use more than one frequency band in the same time instance while communicating via sidelink (SL) interface.

In other words, all control information elements described in the previous description may point to another control information element that can also include a hopping pattern information element P which indicates a possible different location in, e.g. frequency domain for upcoming transmissions. Alternatively or in addition, a different domain such as space may be changed such that the hopping pattern or hopping element p may also relate to space. The transceiver may thus be configured for selecting the future transmission time interval so as to occupy resources on a different frequency when compared to the transmission time interval $12_1$.

A selection according to which the different frequencies and/or transmission time intervals are selected may be in accordance with a predetermined frequency pattern. The predetermined frequency pattern can be set system-wide or may be selected by the transceiver on its own, due to any suitable rule. It may be stored in a memory of the transceiver or may be configured by the network and informed to the transceiver. A network herby can refer to a base station or gNB in a 5G NR network or a eNB such as a base station of a UMTS/LTE/LTE-A/LTE-A Pro/LTE evo network or any element of a core network such as the evolved packet core (EPC) or the 5G core network (5GC). In the 5GC, this can be done by using a particular network function (NF) such as a V2X NF if this exists. The information stored may include information relating to the validity of the pattern across a certain period of time. The transceiver may be configured for reserving resources in a plurality of future transmission time intervals and for selecting the plurality of future transmission time intervals according to the predetermined frequency pattern.

According to an embodiment, the transceiver may have stored a plurality of frequency patterns in its memory, temporarily, by receiving them in operation or during initialization, wherein the transceiver may be configured for selecting one of the plurality of patterns based on a parameter such as a monitored data traffic. For example, it may select a pattern that is deemed to face a low amount of traffic, i.e., less used frames or transmission time intervals when compared to other patterns. Alternatively or in addition, the transceiver may receive control information or a control signal that indicates one of the plurality of patterns to be selected.

Figure 9:
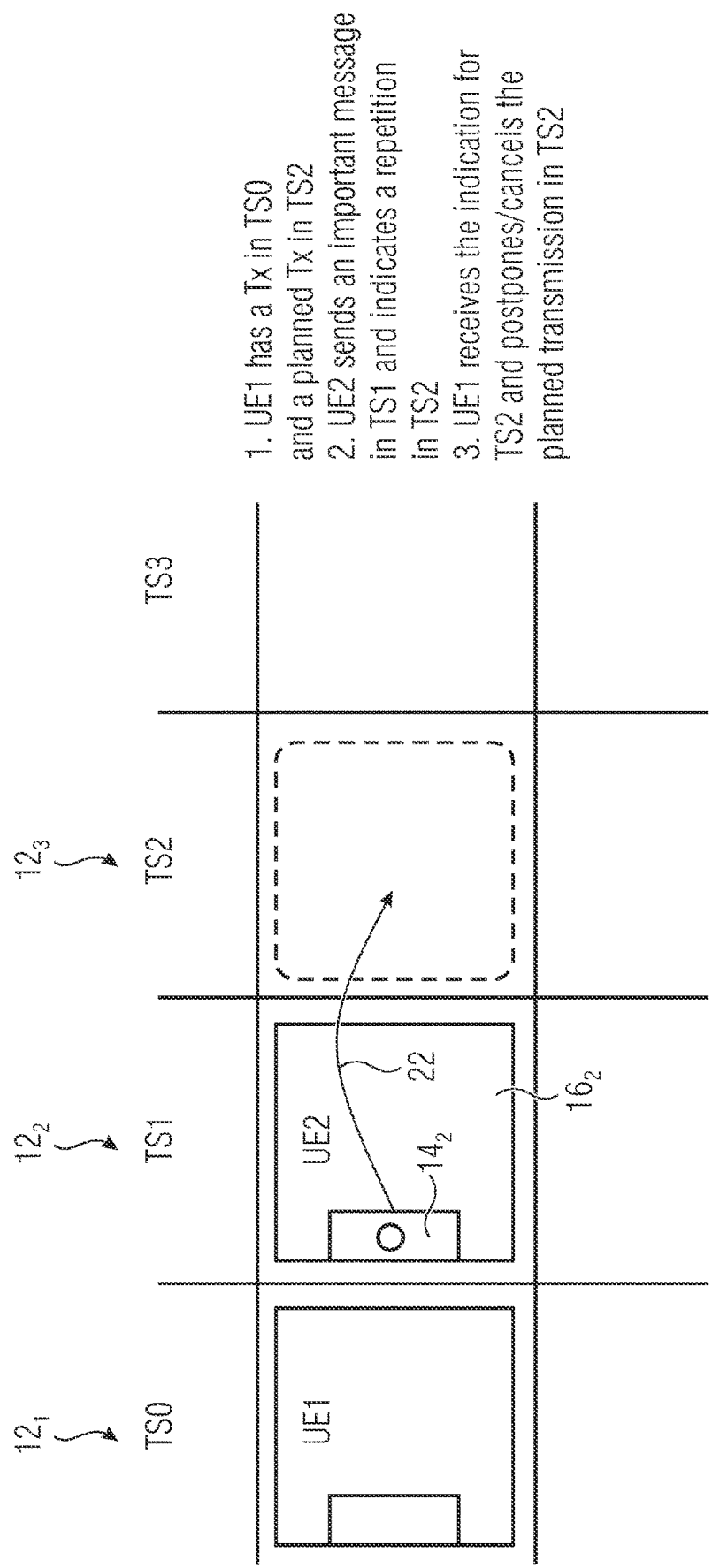
FIG. 9 shows a schematic representation of a general example how user equipments may pre-empted their data for a high priority transmission of another UE according to an embodiment.

FIG. 9 shows a general example how a user equipment may pre-empt its data for a high priority transmission of another UE. For example, a transceiver may alternatively or in addition to being implemented to transmit reservation information be configured for receiving a reservation information and for abandoning its own scheduled transmission in the indicated specific resource. By way of example, UE1 (transceiver 1) may transmit in time slot 0 and has planned a transmission in time slot 2, i.e. transmission time interval $12_3$. In transmission time interval $12_2$, UE2, i.e. transceiver 2, may optionally transmit data using data section $16_2$. UE2 may transmit reservation information 22 indicating that UE2 plans a retransmission in TS2, i.e., using transmission time interval $12_3$. UE1 may receive the indication for TS2 and may abandon, e.g. postpone or cancel the planned transmission in transmission time interval $12_3$ so as to avoid collision with UE2.

The transceiver that abandons its transmission may make its decision dependent on a priority or QoS of the transmission that intends to reserve the future transmission time interval. For example, the transceiver may be configured for evaluating an indicated priority of the transmission of UE2 associated with the reservation information. The transceiver UE1 or transceiver 30 may be configured for comparing the indicated priority with an internal priority of the own planned or scheduled transmission in transmission time interval $12_3$. In a case when a comparison between the priorities leads to a comparison result that indicates that the indicated priority of UE2 is above the own priority, UE1 may abandon its transmission. For example, transceiver UE1 may evaluate the control section $14_2$, at least subset $14a$ if implemented, and may detect reservation information 22 transmitted by transceiver UE2 and may, responsive hereto, abandon its own scheduled transmission in the indicated specific resource. Otherwise, for example, when the priority of UE2 is below the own priority and/or is equal to the own priority, UE1 may decide not to abandon the scheduled transmission based on the comparison result.

That is, independent from the detailed configuration of the control section 14, a transceiver according to an embodiment may be configured for transmitting, using a control channel, information indicating that the transceiver reserves a specific resource in a future time slot. The control channel may be a different channel when compared to the transmission time intervals having the data section 16 and the control section 14.

According to an embodiment, the plurality of resource elements are arranged in the time-frequency grid along a plurality of groups of sub-carriers, wherein each group of sub-carriers forms a time slot element or transmission time interval occupying a frequency band of the plurality of sub-carriers.

Figure 10:
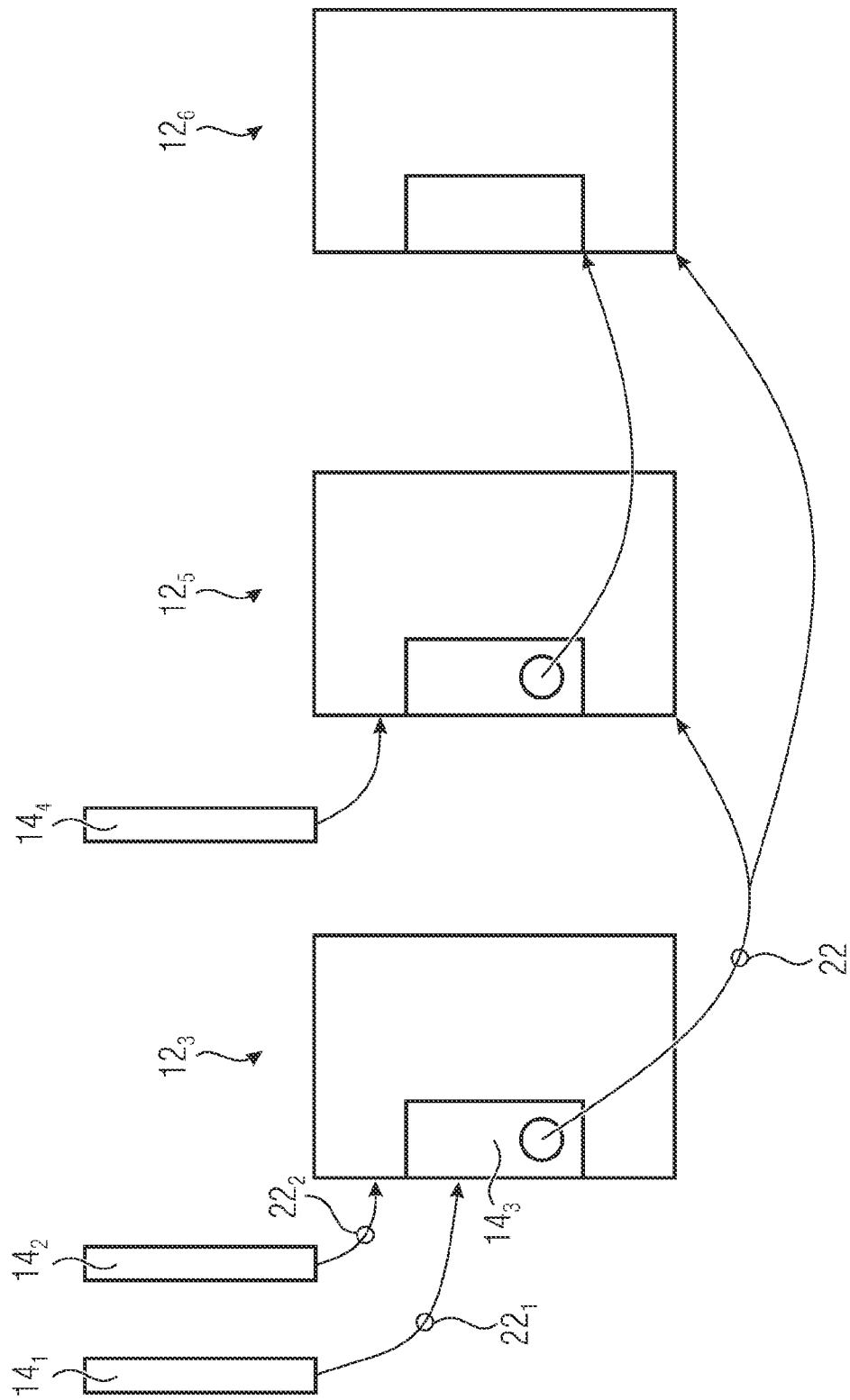
FIG. 10 shows a schematic diagram of an implementation in which control sections of different transmission time intervals are used to signal reservation information pointing to the same future transmission time interval.

Embodiments described therein may be combined with each other unless stated otherwise. For example, FIG. 10 shows an implementation in which control sections $14_1$ and $14_2$ of different transmission time intervals are used to signal reservation information $22_1$ and $22_2$ pointing to the same transmission time interval $12_3$ as described in connection with FIG. 8b. Additionally, control section $14_3$ is used for transmitting reservation information 22 that points to two future transmission time intervals $12_5$ and $12_6$, whilst in transmission time interval $12_5$, the repetition thereof is indicated by pointing to transmission time interval $12_6$. Additionally, transmission time interval $12_4$, control section 144 thereof respectively, is used to indicate reservation of the resources of transmission time interval $12_5$.

In other words, all cases described can be combined in all possible manners to reduce signaling overhead and/or to increase reliability. Furthermore, all examples pre-empting in time and/or frequency domain can also be applied to the spatial domain, e.g., involving beamforming when transmitting into a certain direction.

From FIG. 9 it can be seen that there may occur scenarios in which more than one transceiver attempts to transmit by use of a same resource, e.g., a same complete data section of a transmission time interval. By way of example, UE1 of FIG. 9 may decide not to abandon its own transmission, for example, due to a same or even higher prioritized transmission but, UE2 attempts transmission using transmission time interval $12_3$ based on the reservation information 22.

To avoid collisions, embodiments are directed to a conflict management or conflict resolution. A transceiver may be configured for reserving, for a same transmission, the specific resource and at least one further specific resource, for example, it may reserve resources of two different time slots, frequency bands or transmission time intervals. In the future time slot, the transceiver may be configured for performing a collision avoidance, i.e., to implement a suitable mechanism to avoid collision with other transceivers. For example, the transceiver may use the reserved resources collision-free. For example, the transceiver may be configured for performing a mechanism that is referred to as listen-before-talk (LBT) for collision avoidance. Such a mechanism may implement a transmission-individual or transceiver-individual back-off counter that determines a time for which the transceiver listens, i.e., receives or sensors the respective channel. After the counter has elapsed and no signal is detected, the transceiver may determine the channel as free and may access the respective resources. The back-off counter may be a random valued back-off counter for allowing some kind of fairness when delaying the transmission. Parameters of the back-off algorithm can be pre-configured, provided by the network, or can be negotiated between UEs themselves, e.g. depending on the priority status of a UE.

Figure 11:
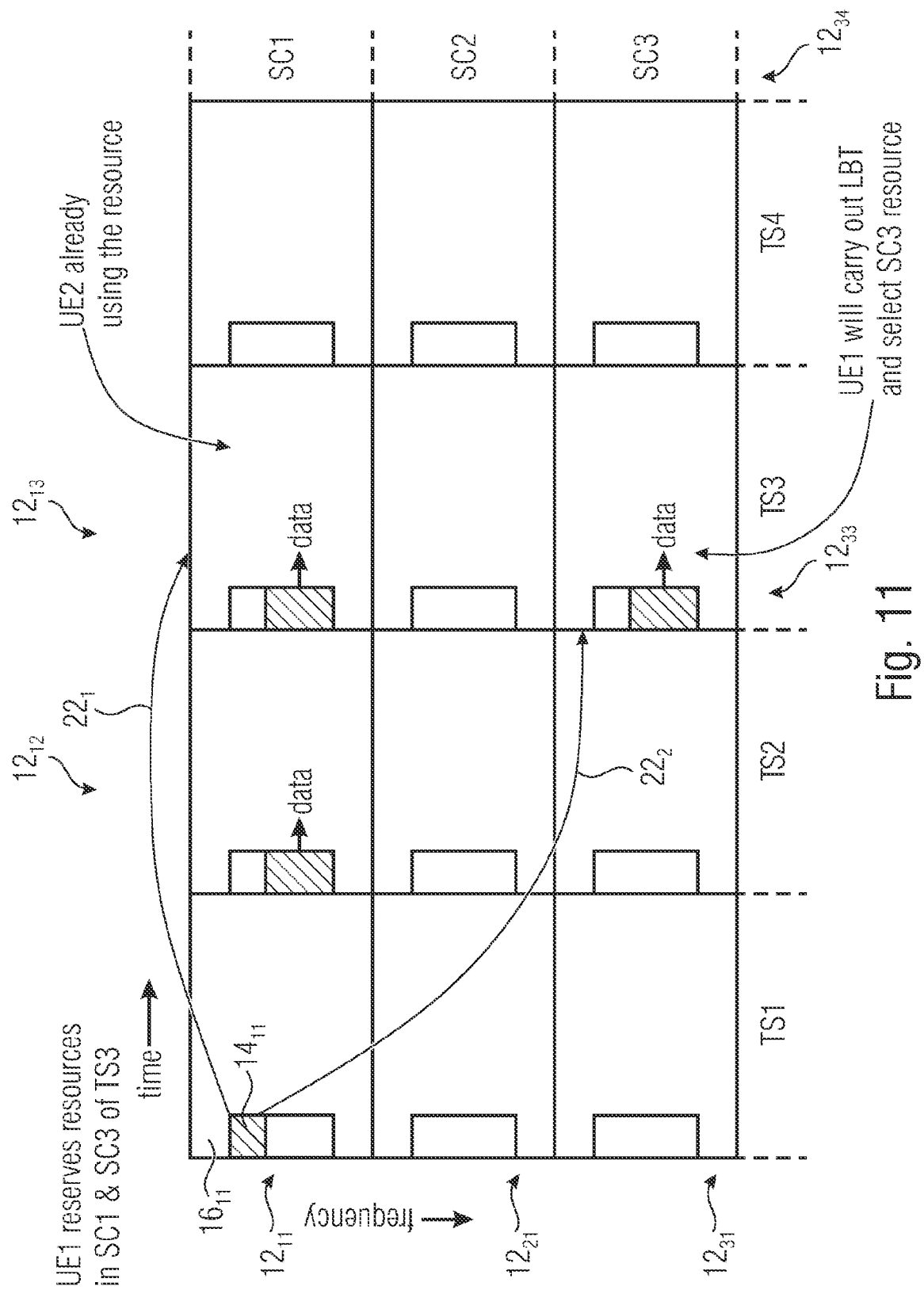
FIG. 11 shows a schematic view of a plurality of transmission time intervals that are arranged over an exemplary number of three sub-channels according to an embodiment.

Advantageously, the transceiver is configured for selecting the further specific resource in a different frequency as the specific resource as it is illustrated in FIG. 11. FIG. 11 shows a schematic view of a plurality of transmission time intervals that are arranged over an exemplary number of three sub-channels SC1 to SC3. By way of the example, a time interval of four time slots or transmission time intervals is illustrated and, by way of example, each transmission time interval occupies a complete time slot TS1 to TS4. transmission time intervals $12_{ij}$ are denoted so as to indicate with parameter "i" the used sub-channel SC and with parameter "j" the respective time slot TS. Thus, transmission time interval $12_{11}$ refers to the first sub-channel and the first time slot, wherein transmission time interval $12_{31}$ refers to the third sub-channel and the first time slot, whilst transmission time interval $12_{34}$ refers to the third sub-channel and the fourth time slot.

A number of sub-channels and a number of time slots may have any arbitrary value.

For example, a transceiver, e.g., transceiver 30 referred to as UE1 may transmit information in control section $14_{11}$ belonging to transmission time interval $12_{11}$ that indicates reservation information $22_1$ to reserve one or more resources of transmission time interval $12_{13}$ and which indicates reservation information $22_2$ to reserve one or more, e.g., a corresponding number, of resources in transmission time interval $12_{33}$. Transmission time intervals $12_{13}$ and $12_{33}$ may be transmitted at a same time but in different sub-channels. By way of example, a different transceiver, e.g., UE2 transmits in sub-channel 1 using transmission time intervals $12_{12}$ and the following transmission time interval $12_{13}$, thereby leading to colliding interests with regard to using transmission time interval $12_{13}$. The transceiver that has transmitted reservation information may listen, i.e., receive information that UE2 has not preempted transmission time interval $12_{13}$ but, instead transmits data therein. At a same time, the transceiver may determine that transmission time interval $12_{33}$ is unused, either as being initially unused or as a response to the reservation information $22_2$ and will select the resources of sub-channel 3 in time slot 3 for transmission.

Although, it is also possible to select different time slots with the reservation information $22_1$ and $22_2$, selecting a same time slot may allow for ensuring a transmission within a specific time as only different frequency bands are selected. Alternatively to selecting only one transmission time interval for reservation or, as shown in FIG. 11, two transmission time intervals, the transceiver may be configured for reserving in a higher number of transmission time intervals or time slots, either at the same time or a different time. Alternatively or in addition to varying frequency while maintaining the time slot, the time slot may be adapted.

Although, FIG. 11 shows the collision avoidance in the time-frequency-grid, collision avoidance may also make use of a spatial variation.

In other words, when a UE reserves resources in a future time slot, it essentially employs another UE intending to use the resources in the future time slot to refrain/abandon from its transmission. However, this can cause conflicts in transmissions.

A first possible conflict is, for example, that the UE originally intending to use the reserved time slot (UE2 in FIG. 11) has been scheduled to use resources within the time slot in an SPS manner, e.g., to transmit high priority transmissions as well. A further, second possible conflict may be that more than one UE reserves the same resources within the same future time slot for high priority transmissions.

In order to resolve these conflicts, embodiments allow that a UE reserves more than one resource in a time slot. When a UE, say UE1, transmits a preemptive reservation using PSCCH1 in time slot 1 in order to reserve resources in a future time slot, say time slot 3 or any other time slot, for high priority transmissions, the UE reserves two or more resources in time slot 3, but in different sub-channels.

The UE may than carry out short term sensing (e.g., listen before talk (LBT) with a random back-off counter) within the time slot 3 in order to determine which resource can be used from among the resources reserved across the different sub-channels. When UE1 reserves more than one resource at time slot 3, a UE2 already scheduled to use one of the reserved resources with a high priority transmission will not vacate the said resource. UE2 will vacate the resource only if UE1 has a transmission of priority higher than the transmission of UE2. If the priority is equal or less than the priority of the transmission of UE2, it will, in terms of the present example, not vacate the resource. The priority of the transmission of UE1 is indicated in the preempted reservation message in PSCCH1 sent in time slot 1, and hence, UE2 is aware of the priority of the UE1's transmission. Based on those embodiments, UE1 will then carry out LBT on time slot 3 in order to determine which of the two reserved resources are available, and will transmit in the available resource. LBT is also advantageous if more than one UE reserves the same resource, due to LBT's random back-off counter. Both UEs will have different back-off counters, enabling them to listen and check whether any other UE will use the resource in question. Embodiments may be implemented in mobile communication, in particular, in vehicular communication systems, e.g., V2X, as in the context of cellular (e.g., 3G, 4G, 5G or future) or ad-hoc communication networks.

Figure 12:
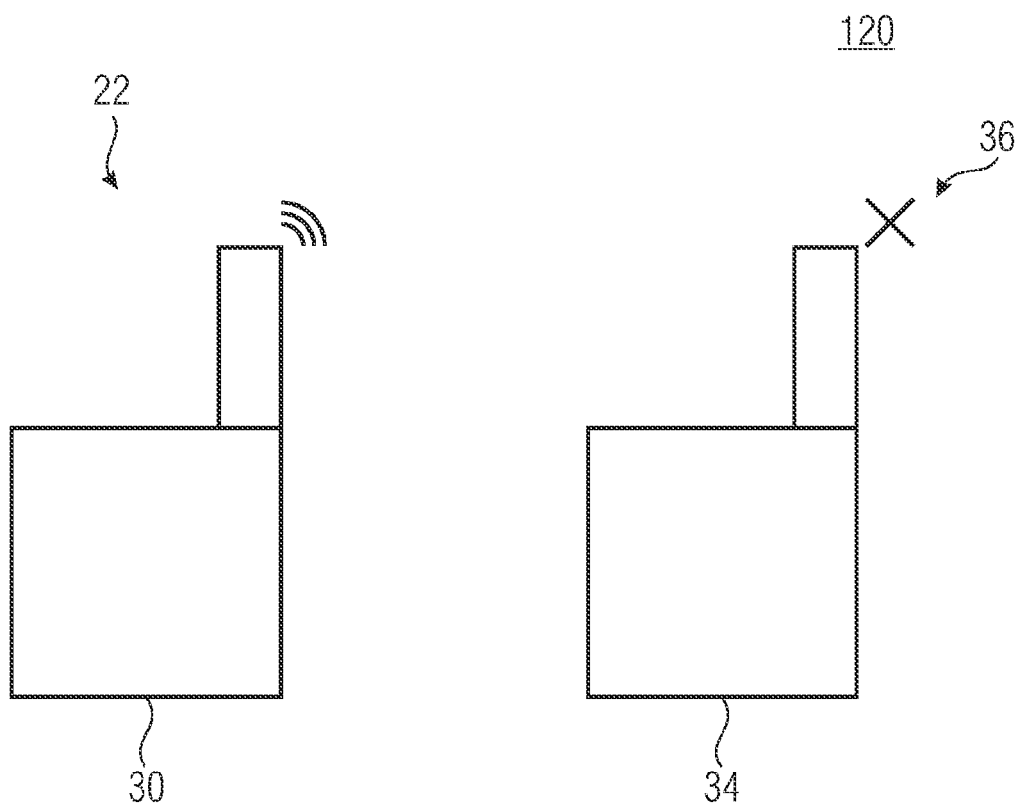
FIG. 12 shows a schematic block diagram of a wireless communication network according to an embodiment.

FIG. 12 shows a schematic block diagram of a wireless communication network 120 according to an embodiment comprising at least one transceiver 30 and at least one transceiver 34. The transceiver 34 may be configured for abandoning its own transmission responsive to the reservation information 22. As described, the transceiver 34 may be another transceiver 30, implemented to send reservation information 22 and to react thereon by implementing an abandoning 36 of own transmission.

In the following, additional embodiments and aspects of the invention will be described which can be used individually or in combination with any of the features and functionalities and details described herein.

1. A transceiver configured for communicating in a wireless communication network being operated so as to schedule communication in a plurality of transmission time intervals, each transmission time interval comprising a plurality of resource elements arranged in a time-frequency grid; wherein each transmission time interval comprises a control section (PSCCH) and a data section (PSSCH);
    wherein the transceiver is configured for transmitting, using a resource in the control section, the resource in the control section containing a reservation information indicating that the transceiver reserves a specific resource in a future transmission time interval.

2. The transceiver of aspect 1, wherein transceiver is configured for using the resource for transmitting the reservation information indicating that the transceiver reserves the specific resource in the future transmission time interval using as a resource of a first subset of resources of the control section; and
    wherein the transmitter is configured for transmitting, in the same or a different transmission time interval and by using a resource of a second subset of the control section, being distinct from the first subset, that contains information associated with the data section of the transmission time interval; or a the data section of a future transmission time interval.

3. The transceiver of aspect 2, wherein the transceiver is adapted to use the first subset of control resources as transceiver unspecific and to use the second subset as transceiver specific.

4. The transceiver of aspect 2 or 3, wherein the control subsets are multiplexed at least partially in a Frequency Division Multiplex (FDM) scheme, wherein the first subset is associated with a first number of resources; wherein the second subset is associated with a second number of resources.

5. The transceiver of one of previous aspects, wherein a resource is at least one of
    a set of resource elements,
    a resource block,
    a set of resource blocks that form a sub channel,
    a set of sub channels.

6. The transceiver of aspect 4 or 5, wherein the first number of resources is one, and is a first resource of the control section in the frequency range.

7. The transceiver of one of aspects 2 to 6, wherein the control subsets are multiplexed at least partially in a Time Division Multiplex (TDM) scheme, wherein the first subset is associated with a first number of symbols; wherein the second subset is associated with a second number of symbols.
8. The transceiver of one of aspects 2 to 7, wherein the control subsets are multiplexed at least partially in a Space Division Multiplex (SDM) scheme, wherein the first subset is associated with a first number of beams; wherein the second subset is associated with a second number of beams.
9. The transceiver of one of aspects 2 to 8, wherein an amount of resources of the first subset of the control section is smaller when compared to an amount of resources of the second subset.
10. The transceiver of one of aspects 2 to 9, wherein the second subset comprises information that allows to decode data received in the transmission time interval.
11. The transceiver of one of aspects 2 to 10, wherein the first subset is configured by the transceiver for transmitting the reservation information so as to indicate a time and frequency information of the future transmission time interval, which contains the second subset of control and the corresponding data.
12. The transceiver of aspect 11, wherein the transceiver is configured for transmitting the reservation information so as to point to the second portion of the control section of a future transmission time interval, which in turn points to a data element of the data section of the said future transmission time interval.
13. The transceiver of one of aspects 2 to 12, wherein the reservation information explicitly points to the specific resource of the future transmission time interval or implicitly points to the data section of the future transmission time interval which points to the specific resource.
14. The transceiver of one of previous aspects, wherein the transceiver is configured for reserving the same specific resource in the future transmission time interval by transmitting the reservation information in at least a first and a second transmission time interval.
15. The transceiver of one of previous aspects, wherein the specific resource is a first specific resource, wherein the transceiver is configured for transmitting the reservation information so as to indicate that the transceiver reserves the first specific resource and at least a second specific resource in the same future transmission time interval; and/or so as to indicate that the transceiver reserves at least a second specific resource in a different future transmission time interval.
16. The transceiver of one of previous aspects, wherein the future transmission time interval is a first future transmission time interval, wherein the reservation information is a first reservation information, wherein the transceiver is configured for transmitting in the first future transmission time interval data using the reserved specific resource, wherein the transceiver is configured for including, into the control section of the first future transmission time interval, a second reservation information so as to reserve a resource in a second, different future transmission time interval for retransmitting the data.
17. The transceiver of one of previous aspects, wherein the specific resource is a first specific resource, wherein the future transmission time interval is a first future transmission time interval, wherein the transceiver is configured for transmitting the reservation information so as to indicate reservation of the first specific resource and of a second specific resource in a second, different future transmission time interval for retransmitting the data.
18. The transceiver of aspect 16 or 17, wherein the transceiver is configured, for retransmitting the data, for transmitting one of an exact copy, a redundancy version of the exact copy, additional data or data different from the transmission in the first future transmission time interval.
19. The transceiver of one of previous aspects, wherein the future transmission time interval is a first future transmission time interval, wherein the transceiver is configured for scheduling data transmission in a plurality of future transmission time intervals including the first future transmission time interval; wherein the transceiver is configured for including, into the control section of the time frame the reservation information so as to indicate a plurality of reservations of specific resources in the plurality of future transmission time intervals; and to retransmit in each of the future transmission time intervals the reservation information related to remaining transmission time intervals.
20. The transceiver of aspect 19, wherein the transceiver is configured for reserving a corresponding specific resource in the plurality of future transmission time intervals and to use a counter that indicates a number of remaining future transmission time intervals for which the specific resource is reserved.
21. The transceiver of one of previous aspects, wherein the transceiver is configured to select the future transmission time interval so as to occupy a same frequency band when compared to the transmission time interval.
22. The transceiver of one of previous aspects, wherein the transceiver is configured to select the future transmission time interval so as to occupy at least one resource on the same frequency when compared to the transmission time interval.
23. The transceiver of one of previous aspects, wherein the transceiver is configured to select the future transmission time interval so as to occupy a different frequency band when compared to the transmission time interval.
24. The transceiver of one of previous aspects, wherein the transceiver is configured to select the future transmission time interval so as to occupy at least one resource on a different frequency when compared to the transmission time interval.
25. The transceiver of aspect 34 or 24, wherein the transmission time interval is implemented so as to uses a first frequency; wherein the transceiver is configured for selecting the future transmission time interval such that a second, different frequency of the future transmission time interval complies with a predetermined frequency pattern that can at least be stored in a memory of the transceiver, or pre-configured by the network and informed to the transceiver, including the validity of the pattern across a certain period of time.
26. The transceiver of aspect 25, wherein the transceiver is configured for reserving resources in a plurality of future transmission time intervals and to select the plurality of future time frames according to the predetermined frequency pattern.
27. The transceiver of aspect 25 or 26, wherein the transceiver has stored a plurality of frequency patterns is configured for selecting one the plurality based on a monitored data traffic and/or based on a received control signal.

28. The transceiver of one of previous aspects, wherein the transceiver is configured for reserving, for a same transmission, the specific resource and at least one further specific resource; wherein, in the future transmission time interval, the transceiver is configured for performing collision avoidance by using one of the specific resource and the further specific resource that is determined by the transceiver to be available collision-free.

29. The transceiver of aspect 28, wherein the transceiver is configured for performing listen-before-talk for collision avoidance.

30. The transceiver of aspect 28 or 29, wherein the transceiver is configured for using a random back-off counter for delaying a transmission using the specific resource or the further specific resource.

31. The transceiver of one of aspects 28 to 30, wherein the transceiver is configured for selecting the further specific resource in a different frequency as the specific resource.

32. The transceiver of one of previous aspects, wherein the transceiver is a first transceiver and is configured for receiving a reservation information of a second transceiver and for abandoning its own scheduled transmission in the indicated specific resource.

33. The transceiver of aspect 32, wherein the first transceiver is configured for evaluating the control section of the time frame; for detecting reservation information from the second transceiver and for abandoning its own scheduled transmission in the indicated specific resource responsive to the reservation information.

34. The transceiver of aspect 32 or 33, wherein the transceiver is configured for evaluating an indicated priority of a transmission associated with the reservation information; for comparing the indicated priority with an internal priority of the scheduled transmission; for determining a comparison result indicating that the indicated priority is below or equal to its own priority and for not abandoning the scheduled transmission based on the comparison result.

35. A transceiver configured for communicating in a wireless communication network being operated so as to schedule communication in a plurality of transmission time intervals, each transmission time interval comprising a plurality of resource elements arranged in a time-frequency grid; wherein each transmission time interval comprises a control section (PSCCH) and a data section (PSSCH);
wherein the user equipment is configured for transmitting, using a control channel, information indicating that the transceiver reserves a specific resource in a future transmission time interval.

36. The transceiver of one of previous aspects, wherein the transmission time interval is implemented so as to occupy a plurality of subcarriers or resource blocks in a time interval, wherein the control section is transmitted at a beginning of the transmission time interval for a duration of a first time sub-interval and a subset of the plurality of subcarriers or resource blocks, wherein the data section is transmitted, in the first time sub-interval in remaining subcarriers or resource blocks and after the first time sub-interval in the plurality of subcarriers or resource blocks.

37. The transceiver of one of previous aspects, wherein the plurality of resource elements arranged in the time-frequency grid is arranged along a plurality of groups of subcarriers, wherein each group of subcarriers forms a transmission time interval element occupying a frequency band of the plurality of subcarriers.

38. The transceiver of one of previous aspects, wherein the transmission time interval is arranged within one time slot.

39. The transceiver of one of previous aspects, comprising one or more of
a user equipment;
a mobile or immobile base station,
a mobile terminal,
a stationary terminal,
a cellular IoT-UE,
a vehicular UE,
a group leader UE (GL),
an IoT or narrowband IoT, NB-IoT, device,
a ground based vehicle,
an aerial vehicle,
a drone,
a moving base station,
a road side unit (RSU),
a building, and
any other item or device provided with network connectivity enabling the item/device to communicate using the wireless communication network, e.g., a sensor or actuator.

40. The transceiver of any one of the preceding aspects, comprising a base station, wherein the base station comprises one or more of
a macro cell base station,
a small cell base station,
a central unit of a base station,
a distributed unit of a base station,
a road side unit,
a UE,
a group leader (GL),
a relay,
a remote radio head,
an AMF,
an SMF,
a core network entity,
a mobile edge computing entity,
a network slice as in the NR or 5G core context, and
any transmission/reception point, TRP, enabling an item or a device to communicate using the wireless communication network, the item or device being provided with network connectivity to communicate using the wireless communication network.

41. A transceiver configured for communicating in a wireless communication network being operated so as to schedule communication in a plurality of transmission time intervals, each transmission time interval comprising a plurality of resource elements arranged in a time-frequency grid; wherein each transmission time interval comprises a control section (PSCCH) and a data section (PSSCH);
wherein the transceiver is a first transceiver and is configured for receiving, from a second transceiver, a signal using a transmission time interval containing, in the control section, reservation information indicating that the a second transceiver reserves a specific resource in a future transmission time interval;

wherein the transceiver is configured for abandoning its own scheduled transmission in the indicated specific resource.

42. A wireless network comprising:
at least one transceiver according to one of aspects 1 to 41; and
at least one transceiver according to aspect 41.

43. The wireless communication system of aspect 42, wherein the communication is scheduled in a sidelink of the system, the sidelink using a set of sidelink resources defining one or more of:
a resource pool (RP),
a mini-resource pool (mRP),
a band width part, BWP, in a resource pool,
a resource pool in a BWP.

44. Method for operating a transceiver configured for communicating in a wireless communication network being operated so as to schedule communication in a plurality of transmission time intervals, each transmission time interval comprising a plurality of resource elements arranged in a time-frequency grid; wherein each transmission time interval comprises a control section (PSCCH) and a data section (PSSCH); the method comprising:
transmitting, using a resource in the control section, the resource in the control section containing a reservation information indicating to reserve a specific resource in a future transmission time interval.

45. Method for operating a transceiver configured for communicating in a wireless communication network being operated so as to schedule communication in a plurality of transmission time intervals, each transmission time interval comprising a plurality of resource elements arranged in a time-frequency grid; wherein each transmission time interval comprises a control section (PSCCH) and a data section (PSSCH); wherein the transceiver is a first transceiver, the method comprising:
receiving, from a second transceiver, a signal using a transmission time interval containing, in the control section, reservation information indicating that the a second transceiver reserves a specific resource in a future transmission time interval;
abandoning its own scheduled transmission in the indicated specific resource.

46. A computer readable digital storage medium having stored thereon a computer program having a program code for performing, when running on a computer, a method according to aspect 44 or 45.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

| Abbreviations: | |
|---|---|
| V2X | Vehicle-to-Everything |
| 3GPP | Third Generation Partnership Project |
| D2D | Device-to-Device |
| IST | Intelligent Transport Services |
| FR1, FR2 | Frequency Range Designations |
| BS | Base Station |
| eNB | Evolved Node B (3G base station) |
| UE | User Equipment |
| SL | Sidelink |
| V2V | Vehicle-to-Vehicle |
| SCS | Sub Carrier Spacing |
| RB | Resource Block |
| PSCCH | Physical Sidelink Control Channel |
| PSSCH | Physical Sidelink Shared Channel |

| Abbreviations: | |
|---|---|
| TTI | Transmit Time Interval |
| SCI | Sidelink Control Information |
| DCI | Downlink Control Information |
| CP | Cyclic Prefix |
| BWP | Bandwidth Part |
| CORESET | Control Resource Set |
| USS | UE-Specific Search Space |
| CSS | Common Search Space |
| RP | Resource Pool |

The invention claimed is:

1. A transceiver configured for communicating in a wireless communication network being operated so as to schedule communication in a plurality of transmission time intervals, each transmission time interval comprising a plurality of resource elements arranged in a time-frequency grid; wherein each transmission time interval comprises a control section and a data section;
wherein the transceiver is configured for transmitting, using a resource in the control section, the resource in the control section comprising a reservation information indicating that the transceiver reserves a specific resource in a future transmission time interval; and at least one of:
a) wherein the transceiver is configured for using the resource for transmitting the reservation information indicating that the transceiver reserves the specific resource in the future transmission time interval using as a resource of a first subset of resources of the control section; and wherein the transmitter is configured for transmitting, in the same or a different transmission time interval and by using a resource of a second subset of the control section, being distinct from the first subset, that comprises information associated with the data section of the transmission time interval; or a the data section of a future transmission time interval; wherein the first subset is configured by the transceiver for transmitting the reservation information so as to indicate a time and frequency information of the future transmission time interval, which comprises the second subset of control and the corresponding data;
b) wherein the future transmission time interval is a first future transmission time interval, wherein the reservation information is a first reservation information, wherein the transceiver is configured for transmitting in the first future transmission time interval data using the reserved specific resource, wherein the transceiver is configured for comprising, into the control section of the first future transmission time interval, a second reservation information so as to reserve a resource in a second different future transmission time interval for retransmitting the data and/or wherein the specific resource is a first specific resource, wherein the future transmission time interval is a first future transmission time interval, wherein the transceiver is configured for transmitting the reservation information so as to indicate reservation of the first specific resource and of a second specific resource in a second, different future transmission time interval for retransmitting the data; and
c) wherein the future transmission time interval is a first future transmission time interval, wherein the transceiver is configured for scheduling data transmission in a plurality of future transmission time intervals comprising the first future transmission time interval; wherein the transceiver is configured for comprising, into the control section of the time frame the reservation information so as to indicate a plurality of reservations of specific resources in the plurality of future transmission time intervals; and to retransmit in each of the future transmission time intervals the reservation information related to remaining transmission time intervals.

2. The transceiver of claim 1, wherein the transceiver is adapted to use the first subset of control resources as transceiver unspecific and to use the second subset as transceiver specific.

3. The transceiver of claim 1, wherein the control subsets are multiplexed at least partially in a Frequency Division Multiplex (FDM) scheme, wherein the first subset is associated with a first number of resources; wherein the second subset is associated with a second number of resources.

4. The transceiver of claim 1, wherein the control subsets are multiplexed at least partially in a Space Division Multiplex scheme, wherein the first subset is associated with a first number of beams; wherein the second subset is associated with a second number of beams and/or wherein an amount of resources of the first subset of the control section is smaller when compared to an amount of resources of the second subset.

5. The transceiver of claim 1, wherein the second subset comprises information that allows to decode data received in the transmission time interval.

6. The transceiver of claim 1, wherein the transceiver is configured for transmitting the reservation information so as to point to the second subset of the control section of a future transmission time interval, which in turn points to a data element of the data section of the said future transmission time interval and/or
wherein the reservation information implicitly points to the data section of the future transmission time interval which points to the specific resource.

7. The transceiver of claim 1, wherein the transceiver is configured for reserving the same specific resource in the future transmission time interval by transmitting the reservation information in at least a first and a second transmission time interval.

8. The transceiver of claim 1, wherein the specific resource is a first specific resource, wherein the transceiver is configured for transmitting the reservation information so as to indicate that the transceiver reserves the first specific resource and at least a second specific resource in the same future transmission time interval; and/or so as to indicate that the transceiver reserves at least a second specific resource in a different future transmission time interval.

9. The transceiver of claim 1, wherein the transceiver is configured for reserving a corresponding specific resource in the plurality of future transmission time intervals and to use a counter that indicates a number of remaining future transmission time intervals for which the specific resource is reserved.

10. The transceiver of claim 1, wherein the transceiver is configured to select the future transmission time interval so as to occupy a different frequency band when compared to the transmission time interval.

11. The transceiver of claim 1, wherein the transceiver is configured for reserving, for a same transmission, the specific resource and at least one further specific resource; wherein, in the future transmission time interval, the transceiver is configured for performing collision avoidance by using one of the specific resource and the further specific resource that is determined by the transceiver to be available collision-free.

12. The transceiver of claim 1, wherein the transceiver is a first transceiver and is configured for receiving a reservation information of a second transceiver and for abandoning its own scheduled transmission in the indicated specific resource.

13. The transceiver of claim 12, wherein the first transceiver is configured for evaluating the control section of the time frame; for detecting reservation information from the second transceiver and for abandoning its own scheduled transmission in the indicated specific resource responsive to the reservation information.

14. The transceiver of claim 11, wherein the transceiver is configured for evaluating an indicated priority of a transmission associated with the reservation information; for comparing the indicated priority with an internal priority of the scheduled transmission; for determining a comparison result indicating that the indicated priority is below or equal to its own priority and for not abandoning the scheduled transmission based on the comparison result.

15. A wireless network comprising:
at least one transceiver according to claim 1.

16. The wireless communication system of claim 15, wherein the communication is scheduled in a sidelink of the system, the sidelink using a set of sidelink resources defining one or more of:
a resource pool,
a mini-resource pool,
a band width part, BWP, in a resource pool,
a resource pool in a BWP.

* * * * *

UNITED STATES PATENT AND TRADEMARK OFFICE
CERTIFICATE OF CORRECTION

PATENT NO. : 12,156,194 B2
APPLICATION NO. : 17/491059
DATED : November 26, 2024
INVENTOR(S) : Thomas Fehrenbach et al.

Page 1 of 1

It is certified that error appears in the above-identified patent and that said Letters Patent is hereby corrected as shown below:

In the Claims

In Claim 1, Column 23, Line 38, delete "or a the" and insert -- or the --

Signed and Sealed this
Fifteenth Day of April, 2025

Coke Morgan Stewart
*Acting Director of the United States Patent and Trademark Office*